US012283180B2

(12) United States Patent
Nayak et al.

(10) Patent No.: US 12,283,180 B2
(45) Date of Patent: Apr. 22, 2025

(54) SYSTEM AND METHOD FOR VERIFICATION OF TRAFFIC INCIDENTS

(71) Applicant: HERE Global B.V., Eindhoven (NL)

(72) Inventors: Amarnath Nayak, Mumbai (IN); Jerome Beaurepaire, Courbevoie (FR)

(73) Assignee: HERE Global B.V., Eindhoven (NL)

( * ) Notice: Subject to any disclaimer, the term of this patent is extended or adjusted under 35 U.S.C. 154(b) by 356 days.

(21) Appl. No.: 17/976,126

(22) Filed: Oct. 28, 2022

(65) Prior Publication Data

US 2024/0144812 A1 May 2, 2024

(51) Int. Cl.

*G08G 1/01* (2006.01)
*G08G 1/00* (2006.01)
*G08G 1/0967* (2006.01)
*G08G 1/0968* (2006.01)

(52) U.S. Cl.

CPC ......... *G08G 1/0112* (2013.01); *G08G 1/0133* (2013.01); *G08G 1/096725* (2013.01); *G08G 1/096822* (2013.01); *G08G 1/202* (2013.01); *G08G 1/205* (2013.01)

(58) Field of Classification Search

CPC ............... G08G 1/0112; G08G 1/0133; G08G 1/096725; G08G 1/096822; G08G 1/202; G08G 1/205
USPC .......................................................... 701/117
See application file for complete search history.

(56) References Cited

U.S. PATENT DOCUMENTS 10,459,440 B2 10/2019 Rust et al.
11,269,352 B2 3/2022 Tao et al.
2022/0221293 A1* 7/2022 Hara .................. B60W 30/143
2022/0292955 A1* 9/2022 Takasaki .............. G08G 1/0112
2022/0301430 A1* 9/2022 Sudo ...................... H04N 7/183

FOREIGN PATENT DOCUMENTS

EP 3683646 A1 7/2020
JP 2014123239 A 7/2014

OTHER PUBLICATIONS

Zhao et al., "Good practices and a strong baseline for traffic anomaly detection", retrieved from https://openaccess.thecvf.com/content/CVPR2021W/AICity/papers/Zhao_Good_Practices_and_a_Strong_Baseline_for_Traffic_Anomaly_Detection_CVPRW_2021_paper.pdf, 2021, 9 pages.

* cited by examiner

*Primary Examiner* — Mahmoud S Ismail
(74) *Attorney, Agent, or Firm* — DITTHAVONG, STEINER & MLOTKOWSKI

(57) ABSTRACT

The disclosure provides a system, a method, and a computer program product for verification of traffic incident. The system may be configured to receive a traffic incident trigger. Based on the traffic incident trigger, the system may select one or more vehicles for verification of the traffic incident detected at a location. The system may determine a route of travel for each vehicle of the selected one or more vehicles based on the location of the detected traffic incident. The system may reroute the selected one or more vehicles on the respective route of travel determined for each vehicle. The selected one or more vehicles are rerouted to record data of the traffic incident. The system may further verify the detected traffic incident based on the data of the traffic incident recorded by the rerouted one or more vehicles.

20 Claims, 12 Drawing Sheets

300B

SYSTEM AND METHOD FOR VERIFICATION OF TRAFFIC INCIDENTS

TECHNOLOGICAL FIELD

The present disclosure generally relates to traffic incident verification, and particularly relates to systems and methods for verification of traffic incidents by use of autonomous vehicles.

BACKGROUND

Typically, traffic incidents may occur on roads or links due to large amount of traffic. A reliable information about such traffic incidents is required by traffic management systems in order to take necessary steps. For example, the information related to the traffic incidents is required for providing medical help to users associated with the incident. The information related to the traffic incidents is further utilized for providing congestion warnings to nearby vehicles, to inform them to avoid a site of the incident. However, the information related to the traffic incidents received by the traffic management systems may be unreliable, as the information may be transmitted by sensors of a vehicle affected in the accident. In certain scenarios, the information related to the traffic incidents received by the traffic management systems needs to be verified for accurate identification of the traffic incident. However, on certain road which does not have enough traffic, it is difficult to verify the traffic incidents.

Therefore, there is a need for improved system and method for reliable verification of the traffic incidents.

BRIEF SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

The present disclosure provides a system, a method, and a computer programmable product for verification of a traffic incident. The system may enable verification of the traffic incident, based on reception of data of the traffic incident. Generally, conventional systems may rely on sensors of an autonomous vehicle that may be a part of the traffic incident, therefore, the received data of the traffic incident may be unreliable. Moreover, the data of the traffic incident may be needs to be verified due to damage of the sensors of the vehicle part of the traffic incident. On the contrary, the system of the present disclosure may select one or more autonomous vehicles for verification of the traffic incident detected at a location. The system may reroute the selected one or more vehicles on a determined route of travel, for acquisition of data of the traffic incident. The determined route of travel may be a different link of the location of the traffic incident. The system may verify the traffic incident based on the data of the traffic incident acquired by the one or more rerouted vehicles. Therefore, the system enables reception of the data of the traffic incident from multiple sources (such as the one or more reroute vehicles) to obtain the reliable data of the traffic incident. Furthermore, the one or more vehicles may be rerouted on the different link as that of the link of the traffic incident, thus, avoiding creation of additional traffic congestion on the location of the traffic incident.

Some example embodiments disclosed herein provide a system for verification of a traffic incident, the system comprising a memory configured to store computer-executable instructions and one or more processors configured to execute the instructions to receive a traffic incident trigger. The one or more processors are further configured to select one or more vehicles for verification of the traffic incident detected at a location, based on the received traffic incident trigger. The one or more processors are further configured to determine a route of travel for each vehicle of the selected one or more vehicles. The determined route of travel for each vehicle is based on the location of the detected traffic incident. The one or more processors are further configured to reroute the selected one or more vehicles on the respective route of travel determined for each vehicle of the selected one or more vehicles. The selected one or more vehicles are rerouted to record data of the traffic incident. The one or more processors are further configured to verify the detected traffic incident based on the data of the traffic incident recorded by the rerouted one or more vehicles.

According to some example embodiments, the at least one processor is further configured to determine an initial confidence score associated with the detected traffic incident, by use of a machine learning model.

According to some example embodiments, the at least one processor is further configured to provide, as an input to the machine learning model, at least one of a functional class of the detected traffic incident, a level of congestion associated with the detected traffic incident, a type of incident of the detected traffic incident, a current time of a day, a road topology associated with the location of the detected traffic incident, and a current weather condition and an amount of visibility at the location of the detected traffic incident, to receive an output as the initial confidence score associated with the detected traffic incident.

According to some example embodiments, the at least one processor is further configured to determine a number of the one or more vehicles required for the verification of the traffic incident detected at the location, wherein the determination is based on a comparison of an initial confidence score associated with the detected traffic incident with a predefined threshold score.

According to some example embodiments, the at least one processor is further configured to select the one or more vehicles for the verification of the traffic incident based on at least one of proximity of the one or more vehicles with the location of the traffic incident, accessibility of the one or more vehicles to reach near the location of the traffic incident, received confirmation of a user of each vehicle of the one or more vehicles to verify the traffic incident, congestion at the location of the traffic incident, cost incurred for rerouting the one or more vehicles to the determined route of travel, sensors associated with the one or more vehicles, and impact on a distance of travel of the rerouted one or more vehicles. The one or more vehicles are selected to maximize an initial confidence score associated with the detected traffic incident to reach a predefined threshold score with utilization of a minimum number of the selected one or more vehicles.

According to some example embodiments, the at least one processor is further configured to determine the route of travel for each vehicle of the selected one or more vehicles based on at least one of ease of reversal of the one or more vehicles on the determined route of travel, and an amount of diversion required by the one or more vehicles to travel on the determined route of travel as compared to an initial route of travel of the one or more vehicles, and a line of sight of the one or more vehicles to the location of the detected traffic incident on the determined route of travel. The route of travel is determined to maximize an initial confidence score associated with the detected traffic incident to reach a predefined threshold score with utilization of a minimum number of the selected one or more vehicles.

According to some example embodiments, the at least one processor is further configured to generate an updated confidence score based on an initial confidence score associated with the detected traffic incident and the data of the traffic incident recorded by each rerouted vehicle of the one or more vehicles.

According to some example embodiments, the at least one processor is further configured to compare the updated confidence score associated with the detected traffic incident with a predefined threshold score. The at least one processor is further configured to prevent the rerouting of at least one of the selected one or more vehicles based on the comparison, when the updated confidence score is equal to or more than the predefined threshold score. The at least one processor is further configured to control a reversal of the one or more vehicles on the determined route of travel, when the compared updated confidence score is equal to or more than the predefined threshold score.

According to some example embodiments, the received traffic incident trigger is based on at least one of: traffic incident feed associated with the location of the traffic incident, sensor data of a vehicle associated with the traffic incident, and a time space diagram associated with the traffic incident.

Some example embodiments disclosed herein provide a method for verification of a traffic incident. The method may include reception of a traffic incident trigger. The method may further include selection of one or more vehicles for verification of a traffic incident detected at a location, based on the received traffic incident trigger. The method may further include determination of a route of travel for each vehicle of the selected one or more vehicles. The determined route of travel for each vehicle is based on the location of the detected traffic incident. The method may further include rerouting of the selected one or more vehicles on the respective route of travel determined for each vehicle of the selected one or more vehicles. The selected one or more vehicles are rerouted to record data of the traffic incident. The method may further include verification of the detected traffic incident based on the data of the traffic incident recorded by the rerouted one or more vehicles.

According to some example embodiments, the method further comprises determination of an initial confidence score associated with the detected traffic incident, by use of a machine learning model.

According to some example embodiments, the method further comprises providing, as an input to the machine learning model, at least one of a functional class of the detected traffic incident, a level of congestion associated with the detected traffic incident, a type of incident of the detected traffic incident, a current time of a day, a road topology associated with the location of the detected traffic incident, and a current weather condition and an amount of visibility at the location of the detected traffic incident, to receive an output as the initial confidence score associated with the detected traffic incident.

According to some example embodiments, the method further comprises determining a number of the one or more vehicles required for the verification of the traffic incident detected at the location, wherein the determination is based on a comparison of an initial confidence score associated with the detected traffic incident with a predefined threshold score.

According to some example embodiments, the method further comprises selecting the one or more vehicles for the verification of the traffic incident based on at least one of proximity of the one or more vehicles with the location of the traffic incident, accessibility of the one or more vehicles to reach near the location of the traffic incident, received confirmation of a user of each vehicle of the one or more vehicles to verify the traffic incident, congestion at the location of the traffic incident, cost incurred for rerouting the one or more vehicles to the determined route of travel, sensors associated with the one or more vehicles, and impact on a distance of travel of the rerouted one or more vehicles. The one or more vehicles are selected to maximize an initial confidence score associated with the detected traffic incident to reach a predefined threshold score with utilization of a minimum number of the selected one or more vehicles.

According to some example embodiments, the method further comprises determining the route of travel for each vehicle of the selected one or more vehicles based on at least one of ease of reversal of the one or more vehicles on the determined route of travel, an amount of diversion required by the one or more vehicles to travel on the determined route of travel as compared to an initial route of travel of the one or more vehicles, and a line of sight of the one or more vehicles to the location of the detected traffic incident on the determined route of travel. The one or more vehicles are selected to maximize an initial confidence score associated with the detected traffic incident to reach a predefined threshold score with utilization of a minimum number of the selected one or more vehicles.

According to some example embodiments, the method further comprises generating an updated confidence score based on an initial confidence score associated with the detected traffic incident and the data of the traffic incident recorded by each rerouted vehicle of the one or more vehicles.

According to some example embodiments, the method further comprises comparing the updated confidence score associated with the detected traffic incident with a predefined threshold score. The method further comprises preventing the rerouting of at least one of the selected one or more vehicles based on the comparison, when the updated confidence score is equal to or more than the predefined threshold score.

According to some example embodiments, the method further comprises comparing the updated confidence score associated with the detected traffic incident with a predefined threshold score. The method further comprises controlling a reversal of the one or more vehicles on the determined route of travel, when the compared updated confidence score is equal to or more than a predefined threshold score.

Some example embodiments disclosed herein provide a computer programmable product comprising a non-transitory computer readable medium having stored thereon computer executable instruction which when executed by one or more processors, cause the one or more processors to carry out operations for verification of a traffic incident, the operations comprising receiving a traffic incident trigger. The operations further comprise selection of one or more vehicles for verification of a traffic incident detected at a location, based on the received traffic incident trigger. The operations further comprise determination of a route of travel for each vehicle of the selected one or more vehicles. The determined route of travel for each vehicle is based on the location of the detected traffic incident. The operations further comprise rerouting of the selected one or more vehicles on the respective route of travel determined for each vehicle of the selected one or more vehicles. The determined route of travel for each vehicle is based on the location of the detected traffic incident. The operations further comprise verification of the detected traffic incident based on the data of the traffic incident recorded by the rerouted one or more vehicles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
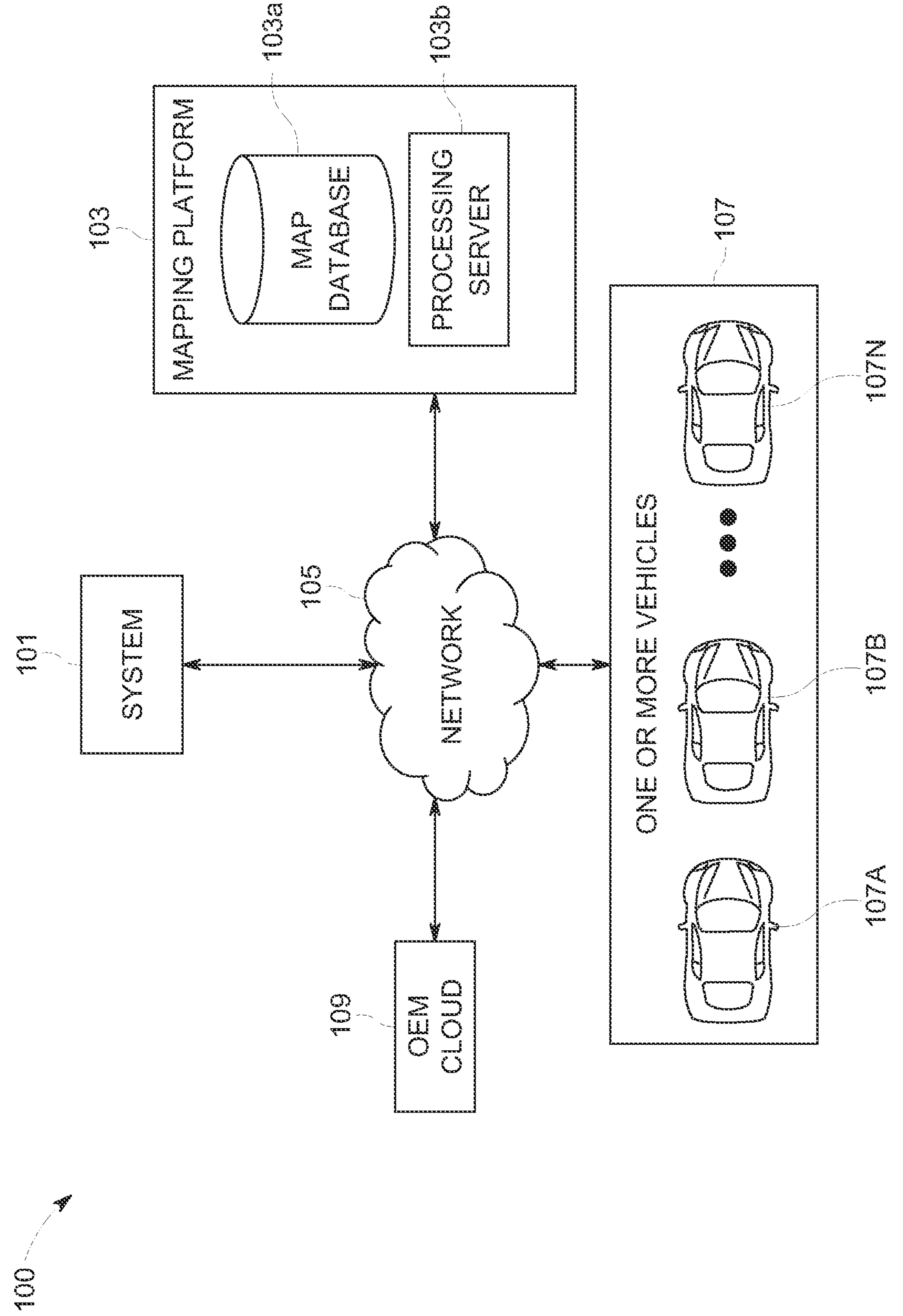
Figure 2A:
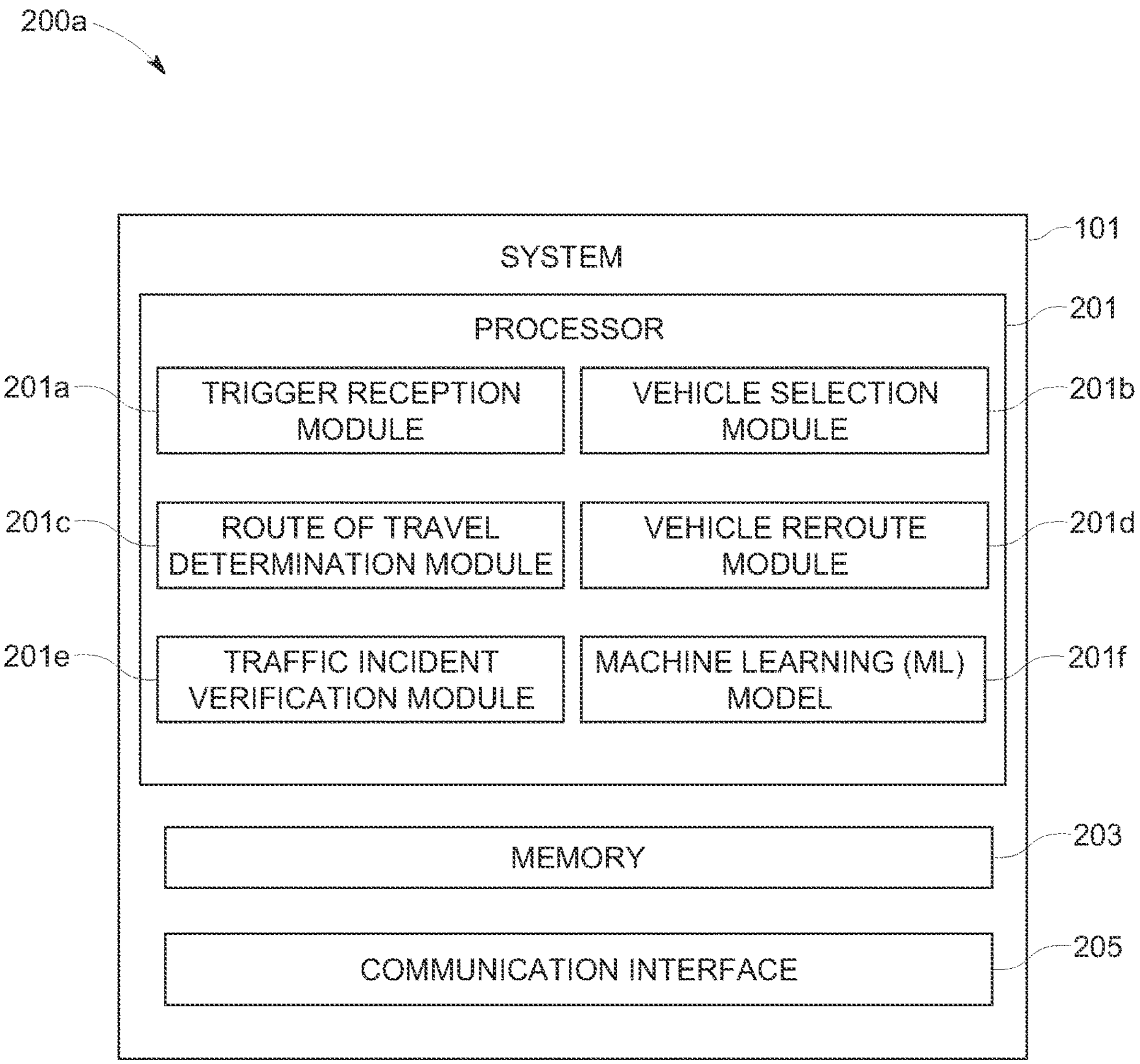
Figure 2B:
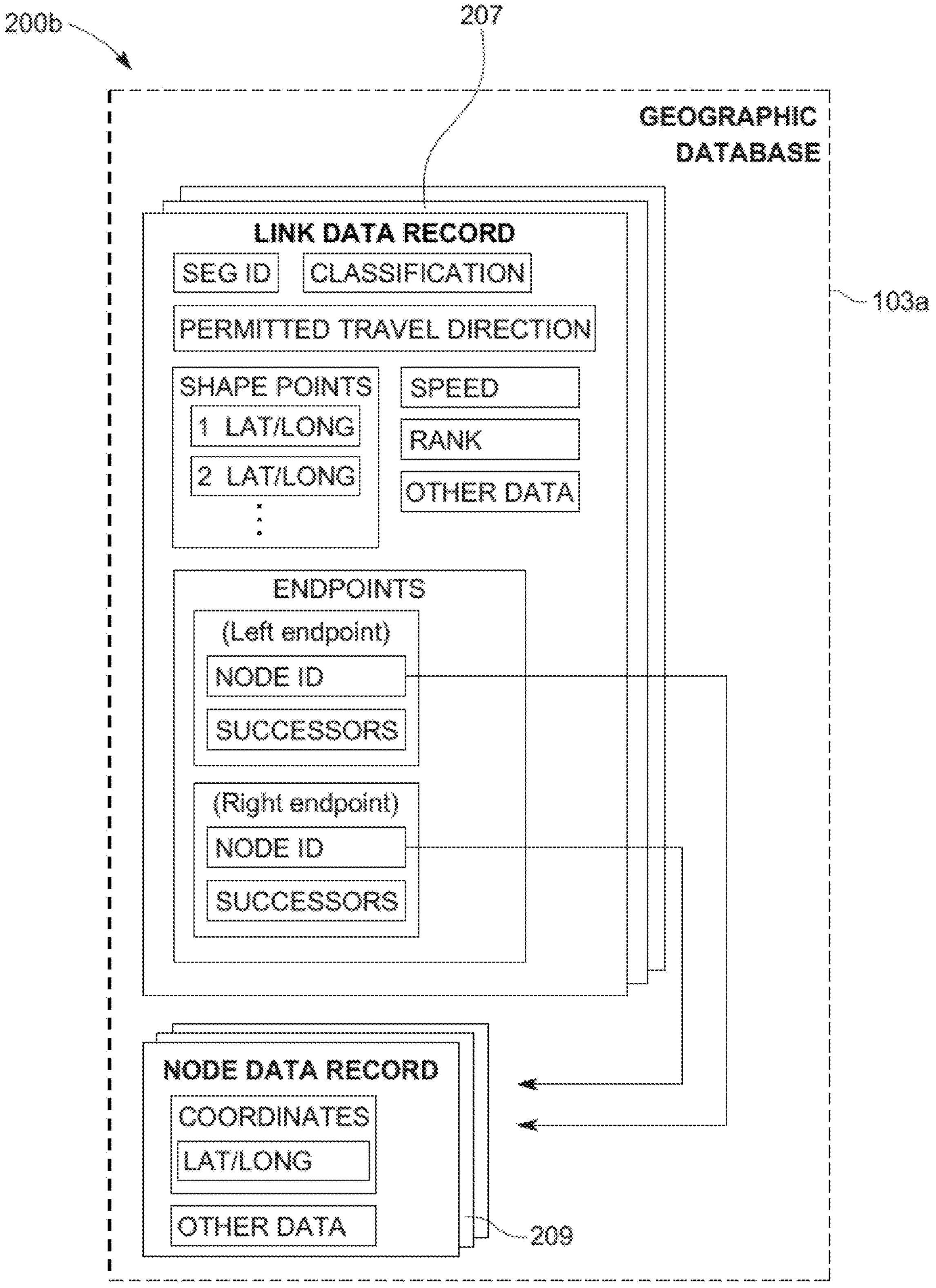
Figure 2C:
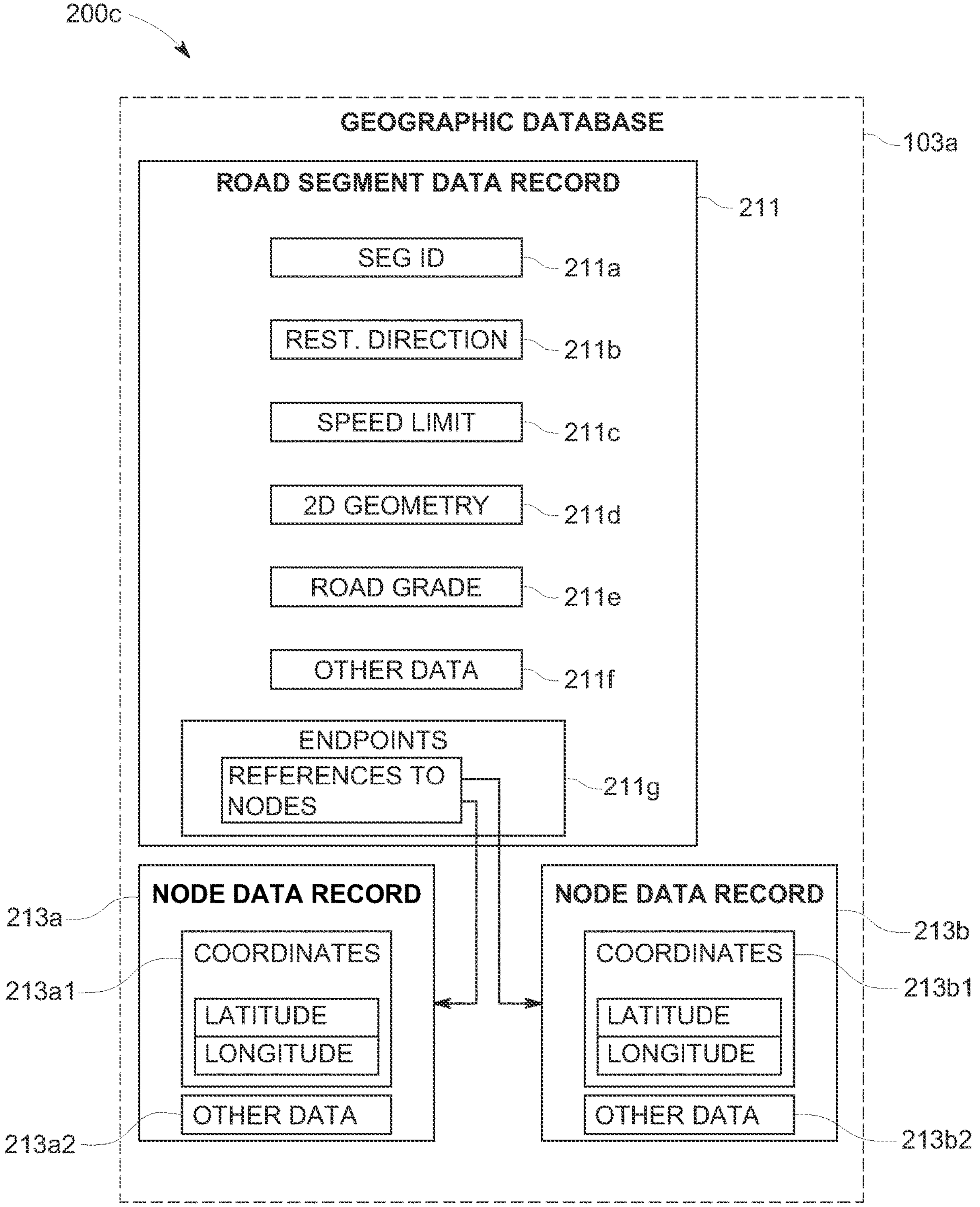
Figure 2D:
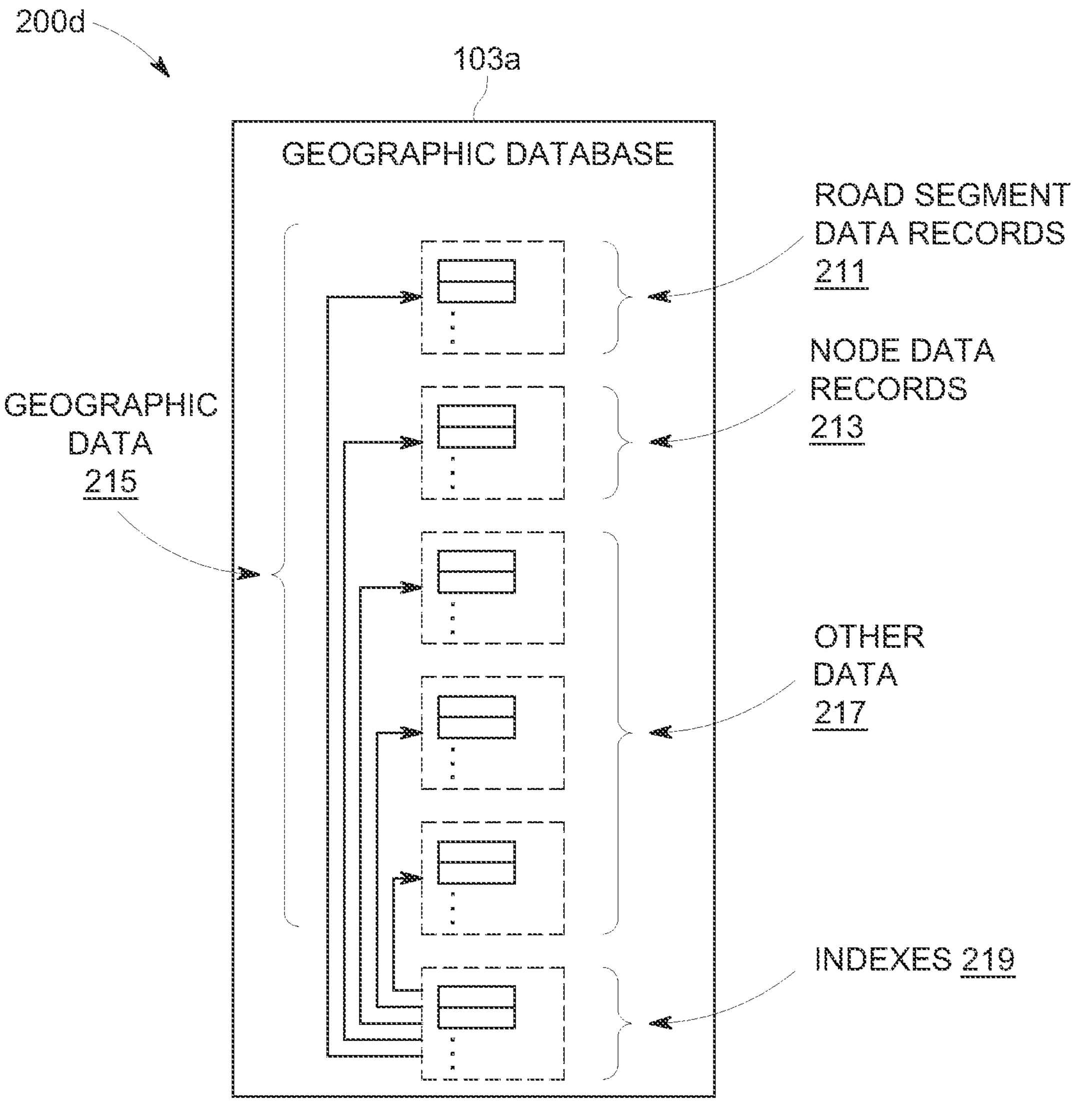
Figure 3A:
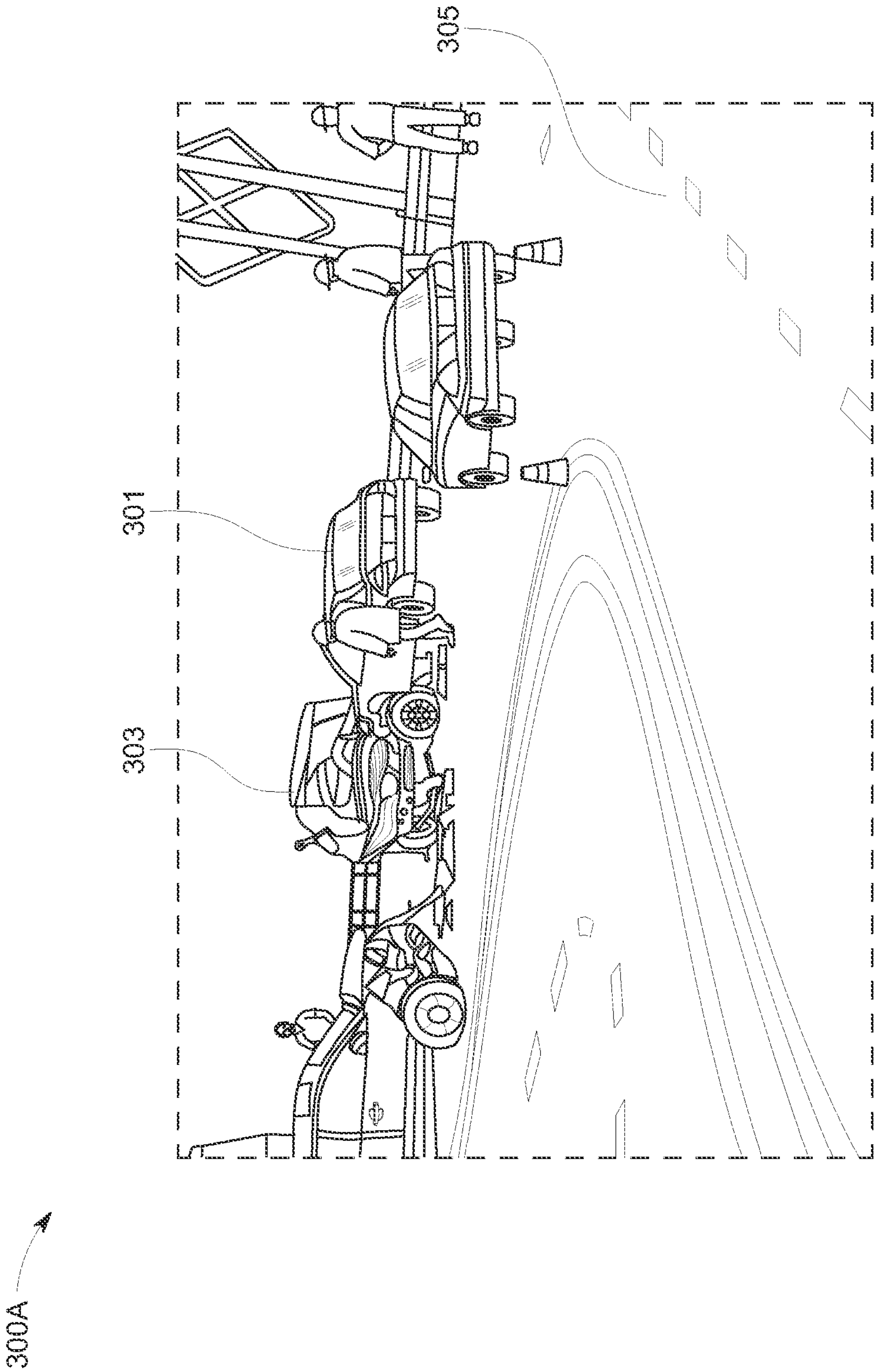
Figure 3B:
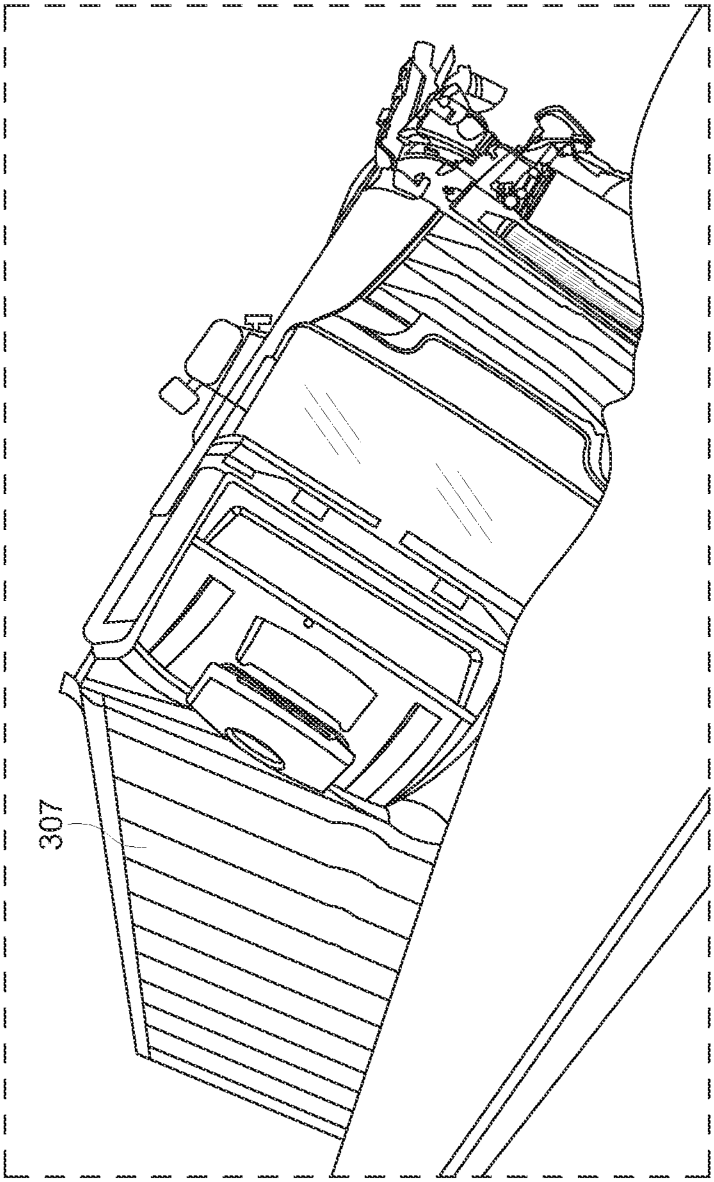
Figure 3C:
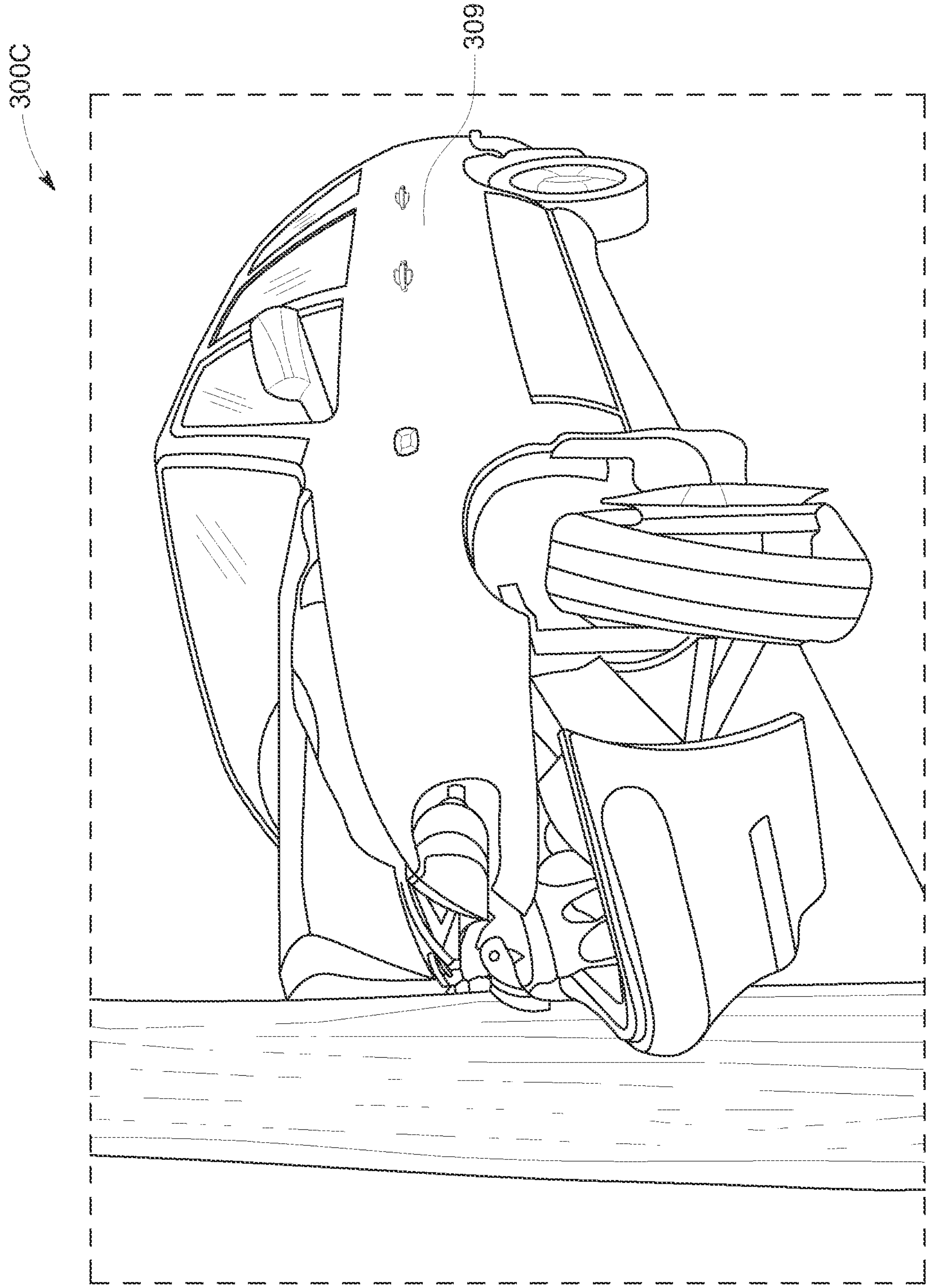
Figure 4:
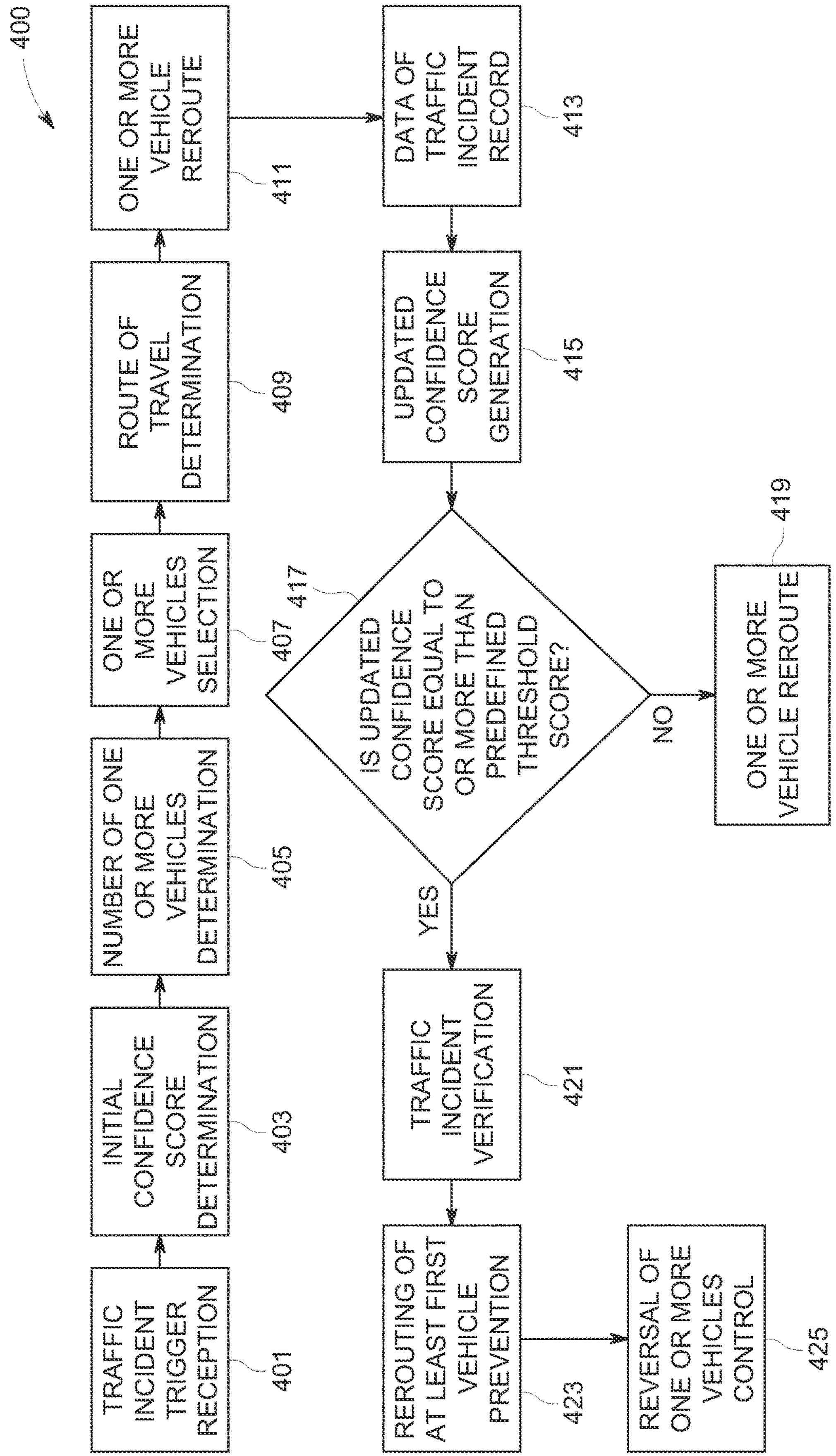
Figure 5A:
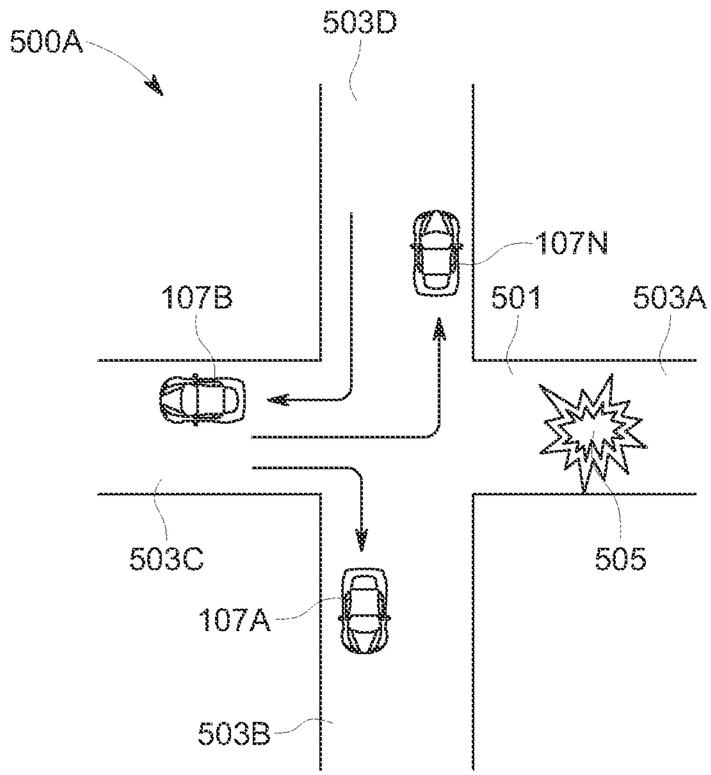
Figure 5B:
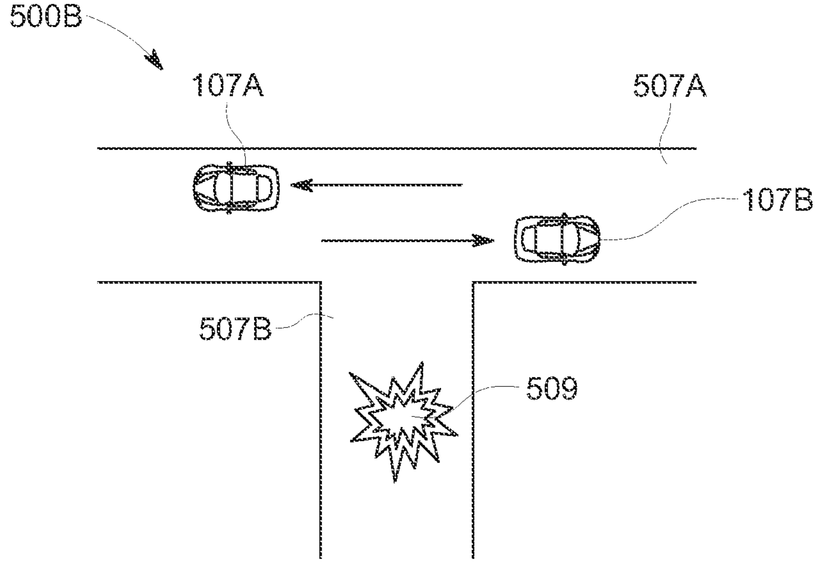
Figure 5C:
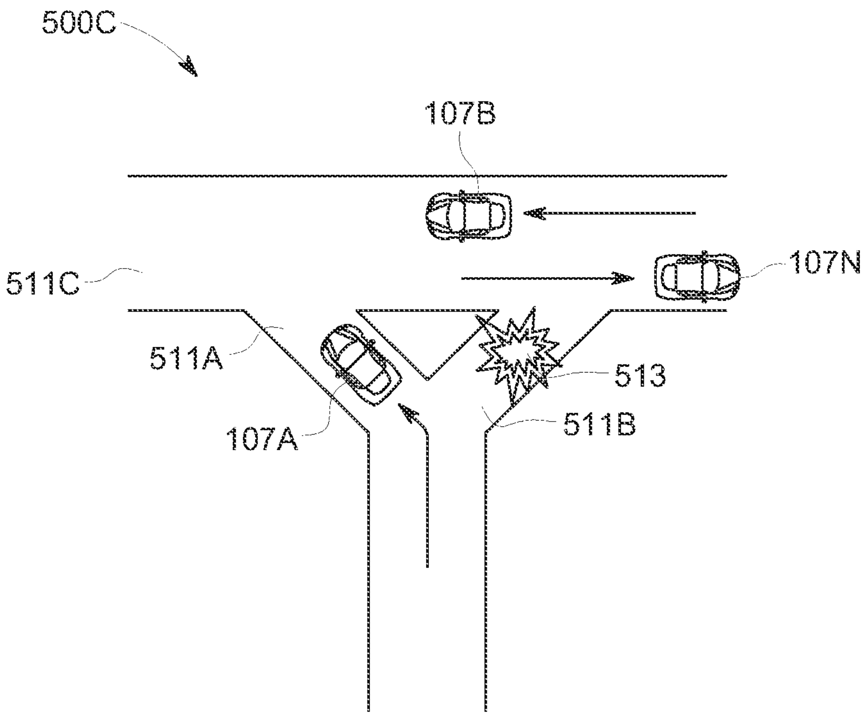
Figure 5D:
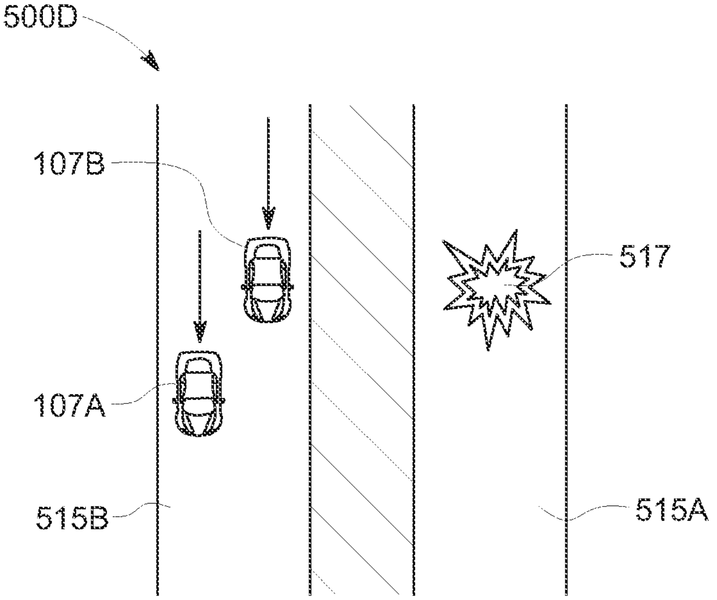
Figure 6:
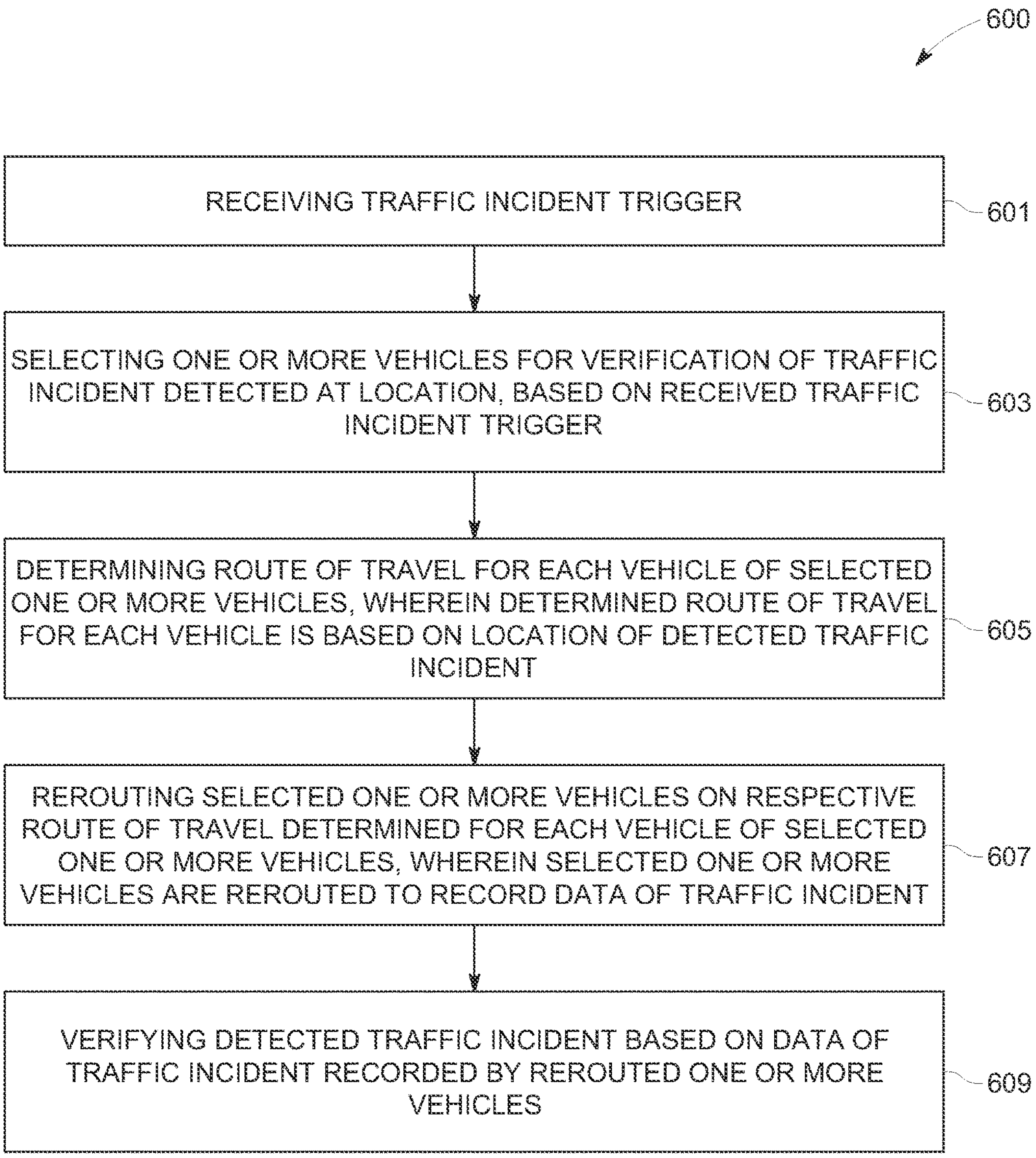

Having thus described example embodiments of the invention in general terms, reference will now be made to the accompanying drawings, which are not necessarily drawn to scale, and wherein:

FIG. 1 illustrates a block diagram of a network environment of a system for verification of a traffic incident, in accordance with an example embodiment;

FIG. 2A illustrates a block diagram of a system for verification of the traffic incident, in accordance with an example embodiment;

FIG. 2B illustrates an example map database record storing data, in accordance with one or more example embodiments;

FIG. 2C illustrates another example map database record storing data, in accordance with one or more example embodiments;

FIG. 2D illustrates another example map database storing data, in accordance with one or more example embodiments;

FIGS. 3A-3C illustrates exemplary scenarios of different traffic incidents, in accordance with an example embodiment;

FIG. 4 illustrates a block diagram of a method showing different steps for the verification of the traffic incident, in accordance with an example embodiment;

FIGS. 5A-5D illustrates exemplary scenarios of rerouting of one or more vehicles for the verification of the traffic incident, in accordance with an example embodiment; and FIG. 6 illustrates a flow diagram of a method for verification of the traffic incident, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "route" may be used to refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car, or autonomous car. For example, the vehicle may have zero passengers or passengers that do not manually drive the vehicle, but the vehicle drives and maneuvers automatically. There can also be semi-autonomous vehicles.

The term "machine learning model" may be used to refer to a computational or statistical or mathematical model that is based in part or on the whole on artificial intelligence and deep learning techniques. The "machine learning model" is trained over a set of data and using an algorithm that it may use to learn from the dataset.

The term "deep learning" is a type of machine learning that utilizes both structured and unstructured data for training.

Please define "confidence score," "initial confidence score" (based on sensor data of the incident vehicle) and "threshold confidence score," and "updated confidence score."

End of Definitions

Embodiments of the present disclosure may provide a system, a method, and a computer program product for verification of the traffic incident.

Generally, conventional systems may rely on sensors of a vehicle that may be a part of the traffic incident, therefore, the received data of the traffic incident may be unreliable. Moreover, the data of the traffic incident may be unreliable due to damage of the sensors of the vehicle part of the traffic incident. Therefore, there is a need for solution for the verification of the traffic incident, such that necessary steps for the detected traffic incident may be carried out. The system, the method, and the computer program product facilitating the verification of the traffic incident in an improved manner are described with reference to FIG. 1 to FIG. 6 as detailed below.

FIG. 1 illustrates a block diagram of a network environment 100 of a system 101 for verification of a traffic incident, in accordance with an example embodiment. The system 101 may be communicatively coupled to a mapping platform 103, one or more vehicles 107 and an OEM (Original Equipment Manufacturer) cloud 109 via a network 105. The mapping platform 103 may further include a map database 103*a* and a processing server 103*b*. The one or more vehicles 107 may include vehicles, such as a first vehicle 107A, a second vehicle 107B, and . . . an Nth vehicle 107N.

The system 101 may be configured to perform one or more operations, such as generation of an updated confidence score and the verification of the traffic incident based on the updated confidence score. The one or more vehicles 107 may be utilized by the system 101 for the verification of the traffic incident. The verified traffic incident may be stored in the map database 103*a*. The system 101, the mapping platform 103 and the one or more vehicles 107 may communicate via the network 105. The one or more operations of the system 101 are described in detail, for example, in FIG. 4.

FIG. 2A illustrates a block diagram 200*a* of the system 101 for verification of the traffic incident, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may further include one or more processing modules, such as a trigger reception module 201*a*, a vehicle selection module 201*b*, a route of travel determination module 201*c*, a vehicle reroute module 201*d*, a traffic incident verification module 201*e* and a machine learning (ML) model 201*f*. The processor 201 may retrieve computer program code instructions that may be stored in the memory 203 for execution of the computer program code instructions.

The trigger reception module 201*a* may be configured to receive the traffic incident trigger associated with the traffic incident. In some embodiments, the traffic incident trigger may be detected by the processor 201. In one or more embodiments, the received traffic incident trigger is based on at least one of a traffic incident feed associated with the location of the traffic incident, sensor data of a vehicle associated with the traffic incident, and a time space diagram associated with the traffic incident.

The vehicle selection module 201*b* may be configured to select the one or more vehicles 107 for the verification of the traffic incident detected at a location, based on the received traffic incident trigger. In some embodiments, the selection of the one or more vehicles 107 may be based on a proximity of the one or more vehicles 107 with the location of the traffic incident, an accessibility of the one or more vehicles 107 to reach near the location of the traffic incident, a received confirmation of a user of each vehicle of the one or more vehicles 107 to verify the traffic incident, an amount of congestion at the location of the traffic incident, a cost incurred for rerouting the one or more vehicles 107 to the determined route of travel, sensors associated with the one or more vehicles 107, and an impact on a distance of travel of the rerouted one or more vehicles 107.

The route of travel determination module 201*c* may be configured to determine a route of travel for each vehicle of the selected one or more vehicles 107. The determined route of travel for each vehicle may be based on the location of the detected traffic incident. In some embodiments, the determined route of travel may be based on an ease of reversal of the one or more vehicles 107 on the determined route of travel, an amount of diversion required by the one or more vehicles 107 to travel on the determined route of travel as compared to an initial route of travel of the one or more vehicles 107, and a line of sight of the one or more vehicles 107 to the location of the detected traffic incident on the determined route of travel. The one or more vehicles are selected to maximize an initial confidence score associated with the detected traffic incident to reach a predefined threshold score with utilization of a minimum number of the selected one or more vehicles 107.

The vehicle reroute module 201*d* may be configured to reroute the selected one or more vehicles 107 on the respective route of travel determined for each vehicle of the selected one or more vehicles 107. The one or more vehicles 107 may be rerouted on the respective route of travel to record data associated with the detected traffic incident.

The traffic incident verification module 201*e* may be configured to verify the detected traffic incident based on the data of the traffic incident recorded by the rerouted one or more vehicles 107. In an embodiment, the detected traffic incident may be verified when an updated confidence score associated with the detected traffic incident is equal to or more than a predefined threshold score.

The ML model 201*f* may be configured to output an initial confidence score associated with a traffic incident. The initial confidence score may indicate a probability of occurrence of the detected traffic incident. For example, a high initial confidence score may indicate that the probability that the detected traffic incident has actually occurred is high, whereas a low initial confidence score may indicate that the probability that the detected traffic incident has actually occurred is low.

FIG. 2B shows format of the map data 200*b* stored in the map database 103*a* according to one or more example embodiments. FIG. 2B shows a link data record 207 and a node data record 209. This link data record 207 has information associated with it that allows identification of the nodes associated with the link and/or the geographic positions of the two nodes. Additionally, in the compiled geographic database, such as a copy of the map database 103*a*, there may also be the node data record 209 for each node.

FIG. 2C shows another format of the map data 200*c* stored in the map database 103*a* according to one or more example embodiments. In the FIG. 2C, the map data 200*c* is stored by specifying a road segment data record 211. The road segment data record 211 is configured to represent data that represents a road network.

FIG. 2D illustrates a block diagram 200*d* of the map database 103*a* storing map data or geographic data 215 in the form of road segments/links, nodes, and one or more associated attributes as discussed above. The map data may also include other kinds of data 217 that may represent other kinds of geographic features or anything else. Furthermore, the map database 103*a* also includes indexes 219. The indexes 219 may include various types of indexes that relate the different types of data to each other or that relate to other aspects of the data contained in the geographic database 103*a*.

FIGS. 3A-3C illustrates exemplary scenarios of different traffic incidents, in accordance with an example embodiment. FIGS. 3A-3C are explained in conjunction with elements of FIGS. 1, 2A, 2B, 2C and 2D. FIG. 3A shows a scenario 300A. The scenario 300A may depict a traffic incident due to collision of vehicles, such as a first vehicle 301 and a second vehicle 303. The traffic incident may occur at on a link 305. Such traffic incidents may cause disruption of traffic on the link 305. Thus, immediate assistance to the collided vehicles, such as the first vehicle 301 and the second vehicle 303, and the accident-related information may be provided to users, such as other vehicles travelling on a same route that includes the link 305. For such cases, the accurate verification of the traffic incident is required.

FIG. 3B shows a scenario 300B. The scenario 300B may depict a traffic incident due to stumbling of a vehicle, such as a lorry 307. The lorry 307 may stumble, for example, due to loss of balance due to carrying of heavy weight, a slippery road, damage to tyres of the lorry 307, and so forth. The lorry 307 may require immediate assistance. The system may enable verification of such kind of traffic incidents such that assistance may be provided to a driver of the lorry 307.

FIG. 3C shows a scenario 300C. The scenario 300C may depict a traffic incident due to collision of a vehicle 309 into an object, such as a tree. For example, the vehicle 309 may be a non-autonomous vehicle. In such a case, the vehicle 309 may be unable to provide accident-related data to a traffic management system. In another example, the vehicle 309 may be the autonomous vehicle, however, sensors of the vehicle 309 may be damaged due to the accident. In such cases, the data associated with the traffic incident may be unreliable or may not be received by the system 101. Thus, the system 101 may enable rerouting of the one or more vehicles 107 to record accurate data of the traffic incident. Details of the verification of the traffic incident are further provided, for example, in FIG. 4.

FIG. 4 illustrates a block diagram 400 of a method showing different steps for the verification of the traffic incident, in accordance with an example embodiment. FIG. 4 is explained in conjunction with elements of FIGS. 1, 2A, 2B, 2C, 2D, 3A, 3B and 3C. It will be understood that each block of the block diagram 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the blocks of the block diagram. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the diagram, and combinations of blocks in the diagram, may be implemented by special purpose hardware-based computer systems which perform the specified functions, or combinations of special purpose hardware and computer instructions. The block diagram 400 of FIG. 4 is implemented for the verification of the traffic incident. Fewer, more, or different steps may be provided.

At a step 401, the traffic incident trigger may be received. The traffic incident trigger may be associated with the traffic incident occurred at a location. In one or more embodiments, the processor 201 may be configured to detect the traffic incident and generate the traffic incident trigger based on the detected traffic incident. The detection of the traffic incident may be based on at least one of traffic incident feed associated with the location of the traffic incident, sensor data of a vehicle associated with the traffic incident, and a time space diagram associated with the traffic incident. Examples of the traffic incident are provided, for example, in FIGS. 3A, 3B and 3C.

The traffic incident may be for example, due to collision of vehicles, slippery road, unfavorable weather conditions and so forth. The processor 201 may be configured to receive the traffic incident feed associated with the location of the traffic incident to detect the traffic incident. In an embodiment, the traffic incident feed may include images of the traffic incident, location coordinates (such as latitude and longitude) of the traffic incident, information about vehicles part of the traffic incident, an identifier of the link of the traffic incident, and so forth.

The processor 201 may further receive the sensor data of the vehicle associated with the traffic incident. For example, the vehicle part of the traffic incident is the autonomous vehicle that may transmit information of the traffic incident to the system 101, based on the collected sensor data. For example, the sensor data may be recorded by a hazard warning system implemented in the vehicle part of the traffic incident. The hazard warning system may include various sensors, such as a global positioning system (GPS) sensor, automatic brakes sensors, air bag sensors, ultrasonic parking sensors, hazard lights sensors, video camera sensors, fog lights sensors, and so forth. The sensor data from such sensors may be recorded by the vehicle part of the traffic incident and transmitted to the system 101.

The processor 201 may further generate the time space diagram associated with the traffic incident. The time space diagram may be generated based on the received traffic incident feed and the sensor data. The time space diagram may depict a relationship between the time and the distance travelled by the vehicles on the link of the traffic incident. The time space diagram is a graph with an X-axis that may correspond to a time at which the vehicles travelled on the link of the traffic incident and a Y-axis that may correspond to a distance covered by vehicles on the link of the traffic incident. Such time space diagram may enable determination of speed of different vehicles passing by the location of the traffic incident. A decrease in speed of the vehicles at the location of the traffic incident may indicate congestion at the location of the traffic incident. Therefore, the processor 201 may utilize the traffic incident feed, the sensor data, and the time space diagram to detect the traffic incident.

At a step 403, an initial confidence score associated with the detected traffic incident may be determined. In some embodiments, the processor 201 may be configured to determine the initial confidence score associated with the detected traffic incident by use of the machine learning model 201*f*. The initial confidence score may indicate an accuracy of the detected traffic incident. For example, the initial confidence score may range between 0 and 1. A higher initial confidence score (such as 1) may indicate that the detected traffic incident is certain. A lower higher initial confidence score (such as 0) may indicate that the detected traffic incident is uncertain.

In some embodiments, the machine learning model 201*f* may be configured to output the initial confidence score based on the input provided to the machine learning model 201*f*. The input may include at least a functional class of the detected traffic incident. In an embodiment, the functional class may depict a type of traffic incident. For example, the type of traffic incident may indicate at least one of an on-road collision, an off-road collision, a rear end collision of the vehicle, a side impact collision of the vehicle, a rollover, a head-on collision of the vehicle, a pile up of multiple vehicles due to accident, and so forth.

In one or more embodiments, the functional class may be defined as a road type indicator, that may reflect a traffic speed and a volume of traffic at the location (such as the link) of the traffic incident. The functional class may have an integer value between 1 and 5. For example, a functional class "1" indicates high volume of the traffic and maximum speed of the traffic. A functional class "2" indicates high volume of the traffic and high speed of the traffic. A functional class "3" indicates high volume of the traffic. A functional class "4" indicates high volume of the traffic at moderate speeds between neighborhoods. A functional class "5" indicates the volume of the traffic and the speed of the traffic below the other functional classes.

The input may further include a level of congestion associated with the detected traffic incident. The level of congestion indicates the amount of traffic am at the location of the traffic incident. The input may further include type of incident of the detected traffic incident. The type of incident may indicate, for example, an accident between two vehicles, an accident between the vehicle and an object, such as a tree, and so forth.

The input may further include a current time of a day. For example, the time of the day may be 02:00 PM. The input may further include a road topology associated with the location of the detected traffic incident. For example, the road topology indicates number of linking roads to the link of the traffic incident, a type of link of the traffic incident, such as a highway, and the like. The input may further include a current weather condition and an amount of visibility at the location of the detected traffic incident. For example, the current weather condition may be summer and humid conditions. In another example, the visibility at the location of the detected traffic incident may be moderate. Based on the input to the machine learning model 201*f*, the initial confidence score may be output.

In an exemplary scenario, the initial confidence score of 0.7 may indicate that the certainty of the detected traffic incident is high. In another exemplary scenario, the initial confidence score of 0.2 may indicate that the certainty of the detected traffic incident is low. Thus, the verification of the detected traffic incident is required to establish the certainty of the detected traffic incident. The processor 201 may further provide data associated with the detected traffic incident. The provided data may include at least the determined initial confidence score. In an embodiment, the provided data may include details of the traffic incident such as the location of the traffic incident and the vehicles part of the traffic incident, and the initial confidence score associated with the detected traffic incident.

At a step 405, a number of the one or more vehicles 107 required for the verification of the traffic incident may be determined. In some embodiments, the processor 201 may be configured to determine the number of the one or more vehicles 107 required for the verification of the traffic incident. The determination of the number of the one or more vehicles 107 may be based on a comparison of the initial confidence score associated with the detected traffic incident with a predefined threshold score.

In an embodiment, the predefined threshold score may be, for example, 0.8. The predefined threshold score may be such defined to ensure the certainty of the detected traffic incident. For example, the initial confidence score equal to or more than the predefined threshold score of 0.8 may ensure that the detected traffic incident is certain and may be valid.

The number of the one or more vehicles 107 may depend on the initial confidence score. For example, if the initial confidence score is low, such as 0.3, in such a case, the number of the one or more vehicles 107 required may be more. In an exemplary scenario, when the initial confidence score is 0.3, the number of the one or more vehicles 107 required may be 10. In another example, if the initial confidence score is high, such as 0.65, in such a case, the number of the one or more vehicles 107 required may be less. In another exemplary scenario, when the initial confidence score is 0.65, the number of the one or more vehicles 107 required may be 4. Thus, as the initial confidence score increases, the requirement of the number of the one or more vehicles 107 for the verification of the traffic incident may decrease. The processor 201 may compare the initial confidence score, such as 0.65 with the predefined threshold score, such as 0.8, to determine the number of the one or more vehicles 107 required for the initial confidence score to reach the predefined threshold score.

At a step 407, the one or more vehicles 107 may be selected for the verification of the traffic incident detected at the location. The processor 201 may be configured to select the one or more vehicles 107 for the verification of the traffic incident detected at the location. In some embodiments, the selected one or more vehicles 107 may be at least one of the autonomous vehicles, or the semi-autonomous vehicles. For example, 6 vehicles may be required. The processor 201 may select 6 vehicles from the one or more vehicles 107, such as the autonomous vehicles for the verification of the traffic incident detected at the location.

In some embodiments, the processor 201 may be configured to select the one or more vehicles 107 for the verification of the traffic incident based on a proximity of the one or more vehicles 107 with the location of the traffic incident. In an embodiment, the proximity of the one or more vehicles 107 may be within a desired limit of the location of the traffic incident. For example, the desired limit may be 5 mile. In such a case, the selected one or more vehicles 107 may be within the desired limit of 5 mile.

The processor 201 may further select the one or more vehicles 107 based on an accessibility of the one or more vehicles 107 to reach near the location of the traffic incident. For example, the one or more vehicles 107 may be travelling on a nearby link of the location of the traffic incident. The processor 201 may determine a link, such as an adjacent link that may be near the link at which the traffic incident occurred. The processor 201 may determine the connectivity between the adjacent link and the link on which the one or more vehicles 107 may be travelling. Based on the accessibility of the one or more vehicles 107 to reach the adjacent link, the one or more vehicles 107 may be selected. In an exemplary scenario, a first autonomous vehicle may be travelling near the location of the traffic incident, however, in order to reach at the adjacent link of the traffic incident, the first autonomous vehicle may require taking a large detour. In such a scenario, the first autonomous vehicle may not be selected as a vehicle of the one or more vehicles 107. In another exemplary scenario, a second autonomous vehicle may require only a small detour to reach the adjacent link of the traffic incident, in such a case, the second autonomous vehicle may be selected as a vehicle of the one or more vehicles 107.

The processor 201 may further select the one or more vehicles 107 based on received confirmation of a user of each vehicle of the one or more vehicles 107 to verify the traffic incident. In an embodiment, the vehicle of the one or more vehicles 107 may be selected when the confirmation is received from the user or the passenger that the user is willing to be a part of the verification of the traffic incident for which the vehicle may take the detour. In an embodiment, the confirmation may be received as a verbal input or by use of a button inside the one or more vehicles 107 used for providing the confirmation.

In an embodiment, the processor 201 may further offer incentives to the user for providing the confirmation to be selected as the vehicle of the one or more vehicles 107 to verify the traffic incident. For example, the incentives may be cost based incentive, access to a faster lane, priority at charging stations, and so forth. Furthermore, the processor 201 may further reception of free images from other automatic vehicles, in future, in exchange of images associated with the traffic incident shared by the selected vehicle. By agreeing to provide the data of the traffic incident, the user may be eligible to high confidence incident reporting whenever required. Thus, by usage of such techniques, the processor 201 may receive the confirmation of the user.

The processor 201 may further select the one or more vehicles 107 based on congestion at the location of the traffic incident. For example, the link of the traffic incident may be congested due to heavy traffic at the location of the traffic incident. In such a scenario, the vehicles on the link of the traffic incident may not be selected as the one or more vehicles 107 to verify the traffic incident as it may cause more congestion at the location of the traffic incident. In such cases, the one or more vehicles 107 may be selected that may be travelling near the link of the traffic incident.

The processor 201 may further select the one or more vehicles 107 based on cost incurred for rerouting the one or more vehicles 107 to the determined route of travel. The cost may be based on for example, a fuel price of the one or more vehicles 107 or electric charging of the one or more vehicles 107. The cost incurred for rerouting the one or more vehicles 107 may be reimbursed to the users of the one or more vehicles 107. In an example, the cost incurred may be less than the cost of travel of the one or more vehicles 107.

The processor 201 may further select the one or more vehicles 107 based on sensors associated with the one or more vehicles 107. For example, the processor 201 may ensure that the selected one or more vehicles 107 may have sufficient sensor capability to record data associated with the traffic incident. In an exemplary scenario, a vehicle with Light Detection and Ranging (LiDAR) may be preferred over a vehicle without the LiDAR to be selected as the vehicle of the one or more vehicles 107. In an exemplary scenario, a vehicle with advanced driver assistance systems (ADAS) may be preferred over a vehicle without the ADAS.

The processor 201 may further select the one or more vehicles 107 based on impact on a distance of travel of the rerouted one or more vehicles 107. The one or more vehicles 107 may be selected such that the distance of travel of the rerouted one or more vehicles 107 may not be substantially impacted. For example, the distance of travel may not increase more than a threshold distance value of 10% of the distance of initial travel before rerouting. In another example, a total time of travel may not increase more than a threshold time value of 25% of the time of initial travel before rerouting. In an embodiment, the threshold distance value and the threshold time value may be configurable and may be set by the users of the one or more vehicles 107. Thus, the one or more vehicles 107 are selected to maximize the initial confidence score associated with the detected traffic incident to reach the predefined threshold score with utilization of the minimum number of the selected one or more vehicles 107.

At a step 409, the route of travel for each vehicle of the selected one or more vehicles 107 may be determined. The processor 201 may be further configured to determine the route of travel for each vehicle of the selected one or more vehicles 107. The determined route of travel for each vehicle may be based on the location of the detected traffic incident.

For example, the link of the detected traffic incident may be congested due to halt in the traffic. In another example, the link of the detected traffic incident may be a narrow link that may lead to congestion.

In some embodiments, the determined route of travel may be exclusive of a lane of the link associated with the location of the traffic incident. As rerouting more vehicles, such as the selected one or more vehicles 107 on the lane associated with the location of the traffic incident may cause more congestion on the lane associated with the location of the traffic incident, thus, the processor 201 may determine the route of travel such that it excludes the lane associated with the location of the traffic incident. The processor 201 may include, for example, an arterial road nearby the location of the traffic incident in the determined route of travel.

The route of travel may be determined to maximize the initial confidence score associated with the detected traffic incident to reach the predefined threshold score with utilization of the minimum number of the selected one or more vehicles 107. For example, the predefined threshold score may be "0.8". The initial confidence score may be "0.4". The route of travel may be determined such that the minimum number of the one or more vehicles 107 may be required to accurately record the data associated with the traffic incident. The recorded data may be used to maximize the initial confidence score to reach the predefined threshold score.

In some embodiments, the processor 201 may be further configured to determine the route of travel for each vehicle of the selected one or more vehicles 107 based on at least ease of reversal of the one or more vehicles 107 on the determined route of travel. For example, there may be unexpected traffic congestion at the determined route of travel, or there may be an emergency situation associated with the user of the vehicle of the one or more vehicles 107. In an exemplary scenario, the one or more vehicles 107 may no longer be required to verify the traffic incidents. In such scenarios, the vehicle of the one or more vehicles 107 may require to be reversed. Thus, the determined route of travel may ensure ease of reversal of the one or more vehicles 107.

The processor 201 may be further configured to determine the route of travel for each vehicle based on an amount of diversion required by the one or more vehicles 107 to travel on the determined route of travel as compared to an initial route of travel of the one or more vehicles 107. For example, the route of travel may be determined such that the one or more vehicles 107 may record the data associated with the traffic incident with least amount of diversion as compared to the initial route of travel of the one or more vehicles 107.

The processor 201 may be further configured to determine the route of travel for each vehicle based on a line of sight of the one or more vehicles 107 to the location of the detected traffic incident on the determined route of travel. The line of sight of the one or more vehicles 107 on the route of travel may be such that the one or more vehicles 107 are able to clearly capture one or more images of the traffic incident as the recorded data. Thus, the processor 201 is able to verify the detected traffic incident more accurately.

At a step 411, the selected one or more vehicles 107 may be rerouted on the respective route of travel determined for each vehicle of the selected one or more vehicles 107. In an embodiment, the processor 201 may be further configured to reroute the selected one or more vehicles 107 on the respective route of travel for verification of the traffic incident. For example, the processor 201 may reroute the one or more vehicles 107 for recording of the data of the traffic incident one by one.

At a step 413, the data of the traffic incident may be recorded. In some embodiments, the rerouted one or more vehicles 107 may utilize one or more sensors to record the data of the traffic incident. For example, the one or more sensors may be the LiDAR, the GPS sensor, a camera, and so forth. Such sensors may be utilized by the one or more vehicles 107 to record the data of the traffic incident. The data of the traffic incident may include for example, the images of the traffic incident, the location coordinates of the traffic incident, the congestion level on the link of the traffic incident, information about the vehicles part of the traffic incident, and so forth.

At a step 415, an updated confidence score may be generated. In some embodiments, the processor 201 may be further configured to generate the updated confidence score based on the initial confidence score associated with the detected traffic incident and the data of the traffic incident recorded by each rerouted vehicle of the one or more vehicles 107. In an exemplary scenario, the initial confidence score may be 0.3. A first vehicle of the one or more vehicles 107 may record the data of the traffic incident. Based on the recorded data, the processor 201 may generate the updated confidence score as 0.4. Further, a second vehicle of the one or more vehicles 107 may record the data of the traffic incident. Based on the recorded data, the processor 201 may update the confidence score of 0.4 to generate the updated confidence score as 0.45. Similarly, based on the data received from each vehicle of the one or more vehicles 107, the processor 201 may generate the updated confidence score.

At a step 417, the processor 201 may be further configured to check if the updated confidence score is equal to or more than the predefined threshold score. For example, the predefined threshold score may be 0.8.

At a step 419, the processor 201 may reroute each vehicle of the one or more vehicles 107 until the updated confidence score is equal to or more than the predefined threshold score. For example, the processor 201 may reroute each vehicle of the one or more vehicles 107 one by one. Based on the data recorded by each vehicle, the processor 201 may generate the updated confidence score each time. In an exemplary scenario, the processor 201 may continue to reroute the vehicles of the one or more vehicles 107 until the updated confidence score is equal to or more than the predefined threshold score.

At a step 421, the processor 201 may be configured to verify the detected traffic incident based on the data of the traffic incident recorded by the rerouted one or more vehicles 107. In an exemplary scenario, the updated confidence score may be 0.82. The predefined threshold score may also be 0.8. Based on the determination that the updated confidence score is more than the predefined threshold score; the verification of the traffic incident may be completed. Thus, the certainty of the traffic incident may be determined accurately and reliably by use of the data recorded by the one or more vehicles 107. Once the detected traffic incident is verified, the processor 201 may update the map database 103*a* with the details of the detected traffic incident and the updated confidence score associated therewith.

It may be noted that the number of vehicles reporting the traffic incident at a beginning of the traffic incident may be high. As the number of traffic incident reports increases, the updated confidence score may keep on increasing. A duration of the traffic incident may be divided into a time quartile. The quartile is the parameter that may be adjusted by the processor 201. For example, if the time quartile is set at 3 minutes then number of traffic incident reported by the vehicles is recorded for each 3 minutes. If the number of traffic incident reports are increasing in each time quartile, then the traffic incident has just started. On the other hand, if the incident has plateaued then the traffic incident is matured and there is severe congestion.

At a step 423, the processor 201 may be further configured to prevent the rerouting of at least one of the selected one or more vehicles 107. The processor may compare the updated confidence score associated with the detected traffic incident with the predefined threshold score. The processor may prevent the rerouting of at least one of the selected one or more vehicles 107 based on a determination that the compared updated confidence score is equal to or more than the predefined threshold score. In an exemplary scenario, 10 vehicles may be selected as the one or more vehicles 107 for the verification of the traffic incident. However, the updated confidence score after the data recorded from a seventh number of vehicle of the one or more vehicles 107 is 0.8 that may be equal to the predefined threshold score of 0.8. In such a case, a remaining three vehicles of the 10 vehicles may be prevented from rerouting as the objective of achieving the updated confidence score equal to or more than the predefined threshold score may be achieved.

At a step 425, the processor 201 may be further configured to control the reversal of the one or more vehicles 107 on the determined route of travel. The processor 201 may compare the updated confidence score associated with the detected traffic incident with the predefined threshold score. The processor 201 may control the reversal of the one or more vehicles 107, when the compared updated confidence score is equal to or more than a predefined threshold score. In an exemplary scenario, a first vehicle of the one or more vehicles 107 may require to be reversed from the determined route of travel, as the objective of achieving the updated confidence score equal to or more than the predefined threshold score may be achieved before recording of the data of the traffic incident by the first vehicle. In such a scenario, the processor 201 may control the reversal of the first vehicle of the one or more vehicles 107 on the determined route of travel.

In one or more embodiments, the processor 201 may utilize other methods to verify the traffic incident other than usage of the one or more vehicles 107. For example, if the one or more vehicles 107 are unavailable for reporting the traffic incident, the processor 201 may utilize systems such as drones and satellites.

The drones may be deployed for specific tiles for aerial surveillance. When the one or more vehicles 107 are not available for confirmation, a message may be sent to the drone to check if the traffic incident has actually happened. Since the drone flies at low altitude, the detection system may work similar to that of the one or more vehicles 107.

Moreover, an altitude of the satellite is quite high, due to which a very high-resolution satellite may be required. Thus, computer vision model may be used to detect the traffic incident from the satellite imagery. Therefore, the one or more vehicles 107, the drone and the satellite may be combined to detect the traffic incident. For example, the one or more vehicles 107 may detect the traffic incident for very close distance, and 50% confidence may be assigned to the one or more vehicles 107, whereas 25% confidence each may be assigned to satellite and drone confirmation.

Moreover, the confidence score may be displayed on a dashboard for the autonomous vehicle user and for the autonomous vehicle to take a real time decision. Furthermore, the passengers of the one or more vehicles may be asked to switch to another vehicle that would bring her/him to destination while the original the one or more vehicles 107 would be more qualified (sensor-wise) to go and inspect the traffic incident, or maybe to offer help. In case the autonomous vehicle is involved in the traffic incident, the autonomous vehicle may communicate with other autonomous vehicles for self-report process and ask for help.

FIGS. 5A-5D illustrates exemplary scenarios of rerouting of one or more vehicles 107 for the verification of the traffic incident, in accordance with an example embodiment. FIG. 5A shows an exemplary scenario 500A of rerouting of one or more vehicles 107 for the verification of the traffic incident. FIG. 5A may include a traffic intersection 501. The traffic intersection 501 may include connected lanes, such as a lane 503A, a lane 503B, a lane 503C and a lane 503D. In an embodiment, the traffic incident may occur at a location 505 at the lane 503A. In such a case, the first vehicle 107A may be rerouted to the lane 503B, the second vehicle 107B may be rerouted to the lane 503C, and the Nth vehicle 107N may be rerouted to the lane 503D to record the data associated with the traffic incident.

FIG. 5B shows an exemplary scenario 500B of rerouting of one or more vehicles 107 for the verification of the traffic incident. FIG. 5B may include a lane 507A connected to a lane 507B. The exemplary scenario 500B may show a location 509 of the traffic incident on the lane 507B. In such a case, the first vehicle 107A and the second vehicle 107B may be selected and may be rerouted on the lane 507A to record the data associated with the traffic incident.

FIG. 5C shows an exemplary scenario 500C of rerouting of one or more vehicles 107 for the verification of the traffic incident. FIG. 5C may include interconnected lanes, such as a lane 511A, a lane 511B and a lane 511C. The exemplary scenario 500C may show a location 513 of the traffic incident on the lane 511B. In such a case, the first vehicle 107A may be rerouted on the lane 511A to record the data associated with the traffic incident. The second vehicle 107B and the Nth vehicle 107N may be rerouted on the lane 511C to record the data associated with the traffic incident.

FIG. 5D shows an exemplary scenario 500D of rerouting of one or more vehicles 107 for the verification of the traffic incident. FIG. 5D may include parallel lanes, such as a lane 515A and a lane 515B separated by a divider. The exemplary scenario 500D may show a location 517 of the traffic incident on the lane 515A. In such a case, the first vehicle 107A and the second vehicle 107B may be rerouted on the lane 515B to record the data associated with the traffic incident.

FIG. 6 illustrates a flow diagram 600 of a method for verification of the traffic incident, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is used for the verification of the traffic incident. Fewer, more, or different steps may be provided.

At step 601, the method 600 comprises receiving the traffic incident trigger. The traffic incident trigger may be associated with the traffic incident occurred at the location. In some embodiments, the traffic incident trigger may be generated by the processor 201 based on the detection of the traffic incident. Details of the reception of the traffic incident trigger are further provided, for example, in FIG. 4.

At step 603, the method 600 comprises selecting the one or more vehicles 107 for verification of the traffic incident detected at the location, based on the received traffic incident trigger. In some embodiments, the selection of the one or more vehicles 107 may be based on the proximity of the one or more vehicles 107 with the location of the traffic incident, the accessibility of the one or more vehicles 107 to reach near the location of the traffic incident, the received confirmation of the user of each vehicle of the one or more vehicles 107 to verify the traffic incident, the amount of congestion at the location of the traffic incident, the cost incurred for rerouting the one or more vehicles 107 to the determined route of travel, the sensors associated with the one or more vehicles 107, and the impact on a distance of travel of the rerouted one or more vehicles 107. Details of the selection of the one or more vehicles 107 are further provided, for example, in FIG. 4.

At a step 605, the method 600 comprises determining the route of travel for each vehicle of the selected one or more vehicles 107. The determined route of travel for each vehicle is based on the location of the detected traffic incident. In some embodiments, the determined route of travel may be based on the ease of reversal of the one or more vehicles 107 on the determined route of travel, and the amount of diversion required by the one or more vehicles 107 to travel on the determined route of travel as compared to the initial route of travel of the one or more vehicles 107. Details of the determination of the route of travel are further provided, for example, in FIG. 4.

At a step 607, the method 600 comprises rerouting the selected one or more vehicles 107 on the respective route of travel determined for each vehicle of the selected one or more vehicles 107. The one or more vehicles 107 may be rerouted on the respective route of travel to record data associated with the detected traffic incident. Details of the reroute of the selected one or more vehicles 107 are further provided, for example, in FIG. 4.

At a step 609, the method 600 comprises verifying the detected traffic incident based on data of the traffic incident recorded by the rerouted one or more vehicles 107. In an embodiment, the detected traffic incident may be verified when the updated confidence score associated with the detected traffic incident is equal to or more than the predefined threshold score. Details of the verification of the traffic incident are further provided, for example, in FIG. 4.

The method 600 may be implemented using corresponding circuitry. For example, the method 600 may be implemented by an apparatus or system comprising a processor, a memory, and a communication interface of the kind discussed in conjunction with FIG. 2A.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise a processor (e.g. the processor 201) configured to perform some or each of the operations of the method of FIG. 6 described previously. The processor may, for example, be configured to perform the operations (601-609) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-609) may comprise, for example, the processor 201 which may be implemented in the system 101 and/or a device or circuit for executing instructions or executing an algorithm for processing information as described above.

Referring again to FIG. 1, the components described in the network environment 100 may be further broken down into more than one component such as one or more sensors or applications in the system 101 and/or combined together in any suitable arrangement. Further, it is possible that one or more components may be rearranged, changed, added, and/or removed.

In an example embodiment, the system 101 may be embodied in one or more of several ways as per the required implementation. For example, the system 101 may be embodied as a cloud-based service or a cloud-based platform. In each of such embodiments, the system 101 may be communicatively coupled to the components shown in FIG. 1 to carry out the desired operations and wherever required modifications may be possible within the scope of the present disclosure. The system 101 may be implemented in a vehicle (for example, the one or more vehicles 107 including the vehicle 107*a*, the vehicle 107*b*, . . . , the vehicle 107*n*), where the vehicle may be an autonomous vehicle, or a semi-autonomous vehicle. Further, in one embodiment, the system 101 may be a standalone unit configured to validate sensor data associated with sensors in a hazard warning system of a vehicle. Alternatively, the system 101 may be coupled with an external device such as the autonomous vehicle. In an embodiment, the system 101 may also be referred to as a user equipment. In some example embodiments, the system 101 may be any user accessible device such as a mobile phone, a smartphone, a portable computer, and the like that are portable in themselves or as a part of another portable/mobile object such as a vehicle. The system 101 may comprise a processor, a memory, and a communication interface. The processor, the memory and the communication interface may be communicatively coupled to each other. In some example embodiments, the system 101 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to a user based on a prediction of a vehicle's accident. In such example embodiments, the system 101 may comprise a processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of system 101. Additional, different, or fewer components may be provided. For example, the system 101 may be configured to execute and run mobile applications such as a messaging application, a browser application, a navigation application, and the like. For example, system 101 may be a dedicated vehicle (or a part thereof) for gathering data related to accident of other vehicles in a database map 103*a*. For example, the system 101 may be a consumer vehicle (or a part thereof). In some example embodiments, the system 101 may serve the dual purpose of a data gatherer and a beneficiary device. The system 101 may be configured to capture sensor data associated with the vehicle or a road which the system 101 may be traversing. In some scenarios, the system 101 may be configured to receive the sensor data from one or more sensors. The sensor data may for example be audio signals in and outside the vehicle, image data of road objects, road signs, hazard data, or the surroundings (for example buildings). The sensor data may refer to sensor data collected from a sensor unit in the system 101. In accordance with an embodiment, the sensor data may refer to the data captured by the vehicle using sensors.

In some other embodiments, the system 101 may be an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103.

The mapping platform 103 may comprise the map database 103*a* for storing map data and a processing server 103*b*. The map database 103*a* may include data associated with vehicle's accidents on road/s, one or more of a road sign, or speed signs, or road objects on the link or path. Further, the map database 103*a* may store accident data, node data, road segment data, link data, point of interest (POI) data, link identification information, heading value records, or the like. Also, the map database 103*a* further includes speed limit data of each lane, cartographic data, routing data, and/or maneuvering data. Additionally, the map database 103*a* may be updated dynamically to cumulate real time traffic conditions based on prediction of vehicle's accident. The real-time traffic conditions may be collected by analyzing the location transmitted to the mapping platform 103 by a large number of road users travelling by vehicles through the respective user devices of the road users. In one example, by calculating the speed of the road users along a length of road, the mapping platform 103 may generate a live traffic map, which is stored in the map database 103*a* in the form of real time traffic conditions based on prediction of vehicle's accident. In one embodiment, the map database 103*a* may further store historical traffic data that includes travel times, accident prone areas, areas with least and maximum accidents, average speeds and probe counts on each road or area at any given time of the day and any day of the year. According to some example embodiments, the road segment data records may be links or segments representing roads, streets, or paths, as may be used in calculating a route or recorded route information for determination of one or more personalized routes to avoid a zone/route with the predicted accident. The node data may be end points corresponding to the respective links or segments of road segment data. The road link data and the node data may represent a road network used by vehicles such as cars, trucks, buses, motorcycles, and/or other entities. Optionally, the map database 103*a* may contain path segment and node data records, such as shape points or other data that may represent pedestrian paths, links, or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103*a* may also store data about the POIs and their respective locations in the POI records. The map database 103*a* may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103*a* may include event data (e.g., traffic incidents, construction activities, scheduled events, unscheduled events, vehicle accidents, diversions etc.) associated with the POI data records or other records of the map database 103*a* associated with the mapping platform 103. Optionally, the map database 103*a* may contain path segment and node data records or other data that may represent pedestrian paths or areas in addition to or instead of the autonomous vehicle road record data. In an embodiment, the map database 103*a* may be a source-available document-oriented database.

In some embodiments, the map database 103*a* may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services in an event of a predicted vehicle's accident, such as route calculation, route guidance, map display, speed calculation, distance and travel time functions, and other functions, by a navigation device, such as by the system 101 or by the UE 107. The navigation-related functions may correspond to vehicle navigation, pedestrian navigation, or other types of navigation to avoid a zone where the vehicle accident has been predicted by the system 101. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103*a* may be a master geographic database, but in alternate embodiments, the map database 103*a* may be embodied as a client-side map database and may represent a compiled navigation database that may be used in the system 101 to provide navigation and/or map-related functions in an event of a predicted vehicle's accident. For example, the map database 103*a* may be used with the system 101 to provide an end user with navigation features. In such a case, the map database 103*a* may be downloaded or stored locally (cached) on the system 101.

The processing server 103*b* may comprise processing means, and communication means. For example, the processing means may comprise one or more processors configured to process requests received from the system 101. The processing means may fetch map data from the map database 103*a* and transmit the same to the system 101 via the OEM cloud 109 in a format suitable for use by the system 101. In one or more example embodiments, the mapping platform 103 may periodically communicate with the system 101 via the processing server 103*b* to update a local cache of the map data stored on the system 101. Accordingly, in some example embodiments, the map data may also be stored on the system 101 and may be updated based on periodic communication with the mapping platform 103. In some embodiments, the map data may also be stored on the UE 107 and may be updated based on periodic communication with the mapping platform 103.

In some example embodiments, the one or more vehicles 107 may include vehicles, such as a first vehicle 107A, a second vehicle 107B, and an Nth vehicle 107N. In an embodiment, the one or more vehicles 107 may be autonomous vehicles or semi-autonomous vehicles. In some embodiments, the one or more vehicles 107 may include a user equipment (UE) that may be a user accessible device such as a mobile phone, a smartphone, a portable computer, and the like, as a part of another portable/mobile object such as the one or more vehicles 107. The UE may comprise a processor, a memory, and a communication interface. The processor, the memory and the communication interface may be communicatively coupled to each other. In some example embodiments, the UE may be associated, coupled, or otherwise integrated with the one or more vehicles 107, such as an advanced driver assistance system (ADAS), a personal navigation device (PND), a portable navigation device, an infotainment system and/or other device that may be configured to provide route guidance and navigation related functions to the user. In such example embodiments, the UE may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE. Additional, different, or fewer components may be provided. In one embodiment, the UE of the one or more vehicles 107 may be directly coupled to the system 101 via the network 105. Moreover, the one or more vehicles 107 may be dedicated vehicles (or a part thereof) for gathering data for development of the map data in the database 103*a*. In some example embodiments, at least one user equipment such as the UE may be coupled to the system 101 via the OEM cloud 109 and the network 105. For example, the one or more vehicles 107 may be consumer vehicles (or a part thereof) and may be a beneficiary of the services provided by the system 101. In some example embodiments, the UE may serve the dual purpose of a data gatherer and a beneficiary device. The UE may be configured to capture the sensor data associated with a road which the UE may be traversing. The sensor data may for example be image data of road objects, road signs, or the surroundings. The sensor data may refer to sensor data collected from a sensor unit in the UE or the one or more vehicles 107. In accordance with an embodiment, the sensor data may refer to the data captured by the vehicle using sensors. The one or more vehicles 107 may be communicatively coupled to the system 101, the mapping platform 103 and the OEM cloud 109 over the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof In an example, the mapping platform 103 may be integrated into a single platform to provide a suite of mapping and navigation related applications for OEM devices, such as the user devices and the system 101. The system 101 may be configured to communicate with the mapping platform 103 over the network 105. Thus, the mapping platform 103 may enable provision of cloud-based services for the system 101, such as, storing the lane marking observations in an OEM cloud in batches or in real-time.

Referring again to FIG. 2A, the processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101, where the users may be a traveler, a rider, a pedestrian, and the like. In some embodiments, the users may be or correspond to the autonomous or the semi-autonomous vehicle, such as the one or more vehicles 107. The IoT related capabilities may in turn be used to provide smart navigation solutions and hazard warnings, such as traffic incident warnings by providing real time updates to the users to take pro-active decision on turn-maneuvers, lane changes, overtaking, merging and the like, big data analysis, and sensor-based data collection by using the cloud-based mapping system for providing navigation recommendation services to the users. The system 101 may further be configured to receive data of the traffic incidents recorded by the one or more vehicle 107. Based on the received data, the system 101 may verify the traffic incidents. The system 101 may be accessed using the communication interface 205. The communication interface 205 may provide an interface for accessing various features and data stored in the system 101.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2A, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the system 101 or any other component with which the system 101 may communicate. The communication interface 205 may be any means such as a device or circuitry embodied in either hardware or a combination of hardware and software that is configured to receive and/or transmit data to/from a communications device in communication with the system 101. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms. In some embodiments, the communication interface 205 may enable communication with a cloud-based network to enable deep learning.

Referring again to FIG. 2B, the link data record 207 may be used to store data about one or more of the feature lines. This link data record 207 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 207 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 207 indicate the position, (e.g., latitude, longitude, and optionally, altitude or elevation) of the selected shape points along the represented link.

Additionally, in the compiled geographic database, such as a copy of the map database 103*a*, there may also be the node data record 209 for each node. The node data record 209 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

Referring again to FIG. 2C, the map database 103*a* contains at least one road segment data record 211 (also referred to as "entity" or "entry") for each road segment in a geographic region.

The map database 103*a* that represents the geographic region of FIG. 2A also includes a database record 213 (a node data record 213*a* and a node data record 213*b*) (or "entity" or "entry") for each node associated with the at least one road segment shown by the road segment data record 211. (The terms "nodes" and "segments" represent only one terminology for describing these physical geographic features and other terminology for describing these features is intended to be encompassed within the scope of these concepts). Each of the node data records 213*a* and 213*b* may have associated information (such as "attributes", "fields", etc.) that allows identification of the road segment(s) that connect to it and/or its geographic position (e.g., its latitude and longitude coordinates).

FIG. 2C also shows some of the components of the road segment data record 211 contained in the map database 103*a*. The road segment data record 211 includes a segment ID 211*a* by which the data record can be identified in the map database 103*a*. Each road segment data record 211 has associated with it information (such as "attributes", "fields", etc.) that describes features of the represented road segment. The road segment data record 211 may include data 211*b* that indicate the restrictions, if any, on the direction of vehicular travel permitted on the represented road segment. The road segment data record 211 includes data 211*c* that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 211 may also include data 211*d* indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 211 also includes road grade data 211*e* that indicate the grade or slope of the road segment. In one embodiment, the road grade data 211*e* include road grade change points and a corresponding percentage of grade change. Additionally, the road grade data 211*e* may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 211*e* includes the road grade change points and an actual road grade value for the portion of the road segment after the road grade change point until the next road grade change point or end node. In a further embodiment, the road grade data 211*e* includes elevation data at the road grade change points and nodes. In an alternative embodiment, the road grade data 211*e* is an elevation model which may be used to determine the slope of the road segment.

The road segment data record 211 also includes data 211*g* providing the geographic coordinates (e.g., the latitude and longitude) of the end points of the represented road segment. In one embodiment, the data 211*g* are references to the node data records 213 that represent the nodes corresponding to the end points of the represented road segment.

The road segment data record 211 may also include or be associated with other data 211*f* that refer to various other attributes of the represented road segment. The various attributes associated with a road segment may be included in a single road segment record or may be included in more than one type of record which cross-reference each other. For example, the road segment data record 211 may include data identifying the name or names by which the represented road segment is known, the street address ranges along the represented road segment, and so on.

FIG. 2C also shows some of the components of the node data record 213 contained in the map database 103*a*. Each of the node data records 213 may have associated information (such as "attributes", "fields", etc.) that allows identification of the road segment(s) that connect to it and/or it's geographic position (e.g., its latitude and longitude coordinates). For the embodiment shown in FIG. 2C, the node data records 213*a* and 213*b* include the latitude and longitude coordinates 213*a*1 and 213*b*1 for their nodes. The node data records 213*a* and 213*b* may also include other data 213*a*2 and 213*b*2 that refer to various other attributes of the nodes.

Thus, the overall data stored in the map database 103*a* may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103*a* in the formats shown in FIGS. 2B and 2C may be combined in a suitable manner to provide these three or more layers of information. In some embodiments, there may be lesser or fewer number of layers of data also possible, without deviating from the scope of the present disclosure.

Referring again to FIG. 2D, the geographic data 215 may be in the form of road segments/links, nodes, and the one or more associated attributes. Furthermore, attributes may refer to features or data layers associated with the link-node database, such as an HD lane data layer.

In addition, the other kinds of data 217 may represent other kinds of geographic features or anything else. The other kinds of data 217 may include point of interest data. For example, the point of interest data may include point of interest records comprising a type (e.g., the type of point of interest, such as restaurant, ATM, etc.), location of the point of interest, a phone number, hours of operation, etc. The map database 103*a* also includes indexes 219. The indexes 219 may include various types of indexes that relate the different types of data to each other or that relate to other aspects of the data contained in the geographic database 103*a*.

The data stored in the map database 103*a* in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103*a* storing data in the form of various layers and formats depicted in FIGS. 2B-2D.

In this way, example embodiments of the invention results in validation of the sensor data associated with the one or more sensors of the hazard warning system of the vehicle, that may be inexpensive and risk-free as compared to the deployed dedicated ground truth drivers. The invention may also provide determination of the accuracy level of the one or more sensors based on the validation result. The invention also allows update of the map database based on the validation result.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for verification of a traffic incident, the system comprising:

at least one non-transitory memory configured to store computer executable instructions; and at least one processor configured to execute the computer executable instructions to:

receive a traffic incident trigger;

select one or more vehicles for verification of the traffic incident detected at a location, based on the received traffic incident trigger;

determine a route of travel for each vehicle of the selected one or more vehicles, wherein the determined route is based on an initial location of each vehicle of the selected one or more vehicles and the location of the detected traffic incident;

reroute the selected one or more vehicles on the respective route of travel determined for each vehicle of the selected one or more vehicles, wherein the selected one or more vehicles are rerouted to record data of the traffic incident; and verify the detected traffic incident based on the data of the traffic incident recorded by the rerouted one or more vehicles.

2. The system of claim 1, wherein the at least one processor is further configured to determine an initial confidence score associated with the detected traffic incident, by use of a machine learning model.

3. The system of claim 2, wherein the at least one processor is further configured to provide, as an input to the machine learning model, at least one of:

a functional class of the detected traffic incident, a level of congestion associated with the detected traffic incident, a type of incident of the detected traffic incident, a current time of a day, a road topology associated with the location of the detected traffic incident, and a current weather condition and an amount of visibility at the location of the detected traffic incident, to receive an output as the initial confidence score associated with the detected traffic incident.

4. The system of claim 1, wherein the at least one processor is further configured to:

determine a number of the one or more vehicles required for the verification of the traffic incident detected at the location, wherein the determination is based on a comparison of an initial confidence score associated with the detected traffic incident with a predefined threshold score.

5. The system of claim 1, wherein the at least one processor is further configured to select the one or more vehicles for the verification of the traffic incident based on at least one of:

proximity of the one or more vehicles with the location of the traffic incident, accessibility of the one or more vehicles to reach near the location of the traffic incident, received confirmation of a user of each vehicle of the one or more vehicles to verify the traffic incident, congestion at the location of the traffic incident, cost incurred for rerouting the one or more vehicles to the determined route of travel, sensors associated with the one or more vehicles, and impact on a distance of travel of the rerouted one or more vehicles, wherein the one or more vehicles are selected to maximize an initial confidence score associated with the detected traffic incident to reach a predefined threshold score with utilization of a minimum number of the selected one or more vehicles.

6. The system of claim 1, wherein the at least one processor is configured to determine the route of travel for each vehicle of the selected one or more vehicles based on at least one of:

ease of reversal of the one or more vehicles on the determined route of travel;

an amount of diversion required by the one or more vehicles to travel on the determined route of travel as compared to an initial route of travel of the one or more vehicles; and a line of sight of the one or more vehicles to the location of the detected traffic incident on the determined route of travel, and wherein the route of travel is determined to maximize an initial confidence score associated with the detected traffic incident to reach a predefined threshold score with utilization of a minimum number of the selected one or more vehicles with utilization of a minimum number of the selected one or more vehicles.

7. The system of claim 1, wherein the at least one processor is further configured to generate an updated confidence score based on an initial confidence score associated with the detected traffic incident and the data of the traffic incident recorded by each rerouted vehicle of the one or more vehicles.

8. The system of claim 7, wherein the at least one processor is further configured to:

compare the updated confidence score associated with the detected traffic incident with a predefined threshold score;

prevent the rerouting of at least one of the selected one or more vehicles based on the comparison, when the updated confidence score is equal to or more than the predefined threshold score; and control a reversal of the one or more vehicles on the determined route of travel, when the compared updated confidence score is equal to or more than the predefined threshold score.

9. The system of claim 1, wherein the received traffic incident trigger is based on at least one of: traffic incident feed associated with the location of the traffic incident, sensor data of a vehicle associated with the traffic incident, and a time space diagram associated with the traffic incident.

10. A method for verification of a traffic incident, the method comprising:

receiving a traffic incident trigger;

selecting one or more vehicles for verification of a traffic incident detected at a location, based on the received traffic incident trigger;

determining a route of travel for each vehicle of the selected one or more vehicles, wherein the determined route of travel for each vehicle is based on the location of the detected traffic incident;

rerouting the selected one or more vehicles on the respective route of travel determined for each vehicle of the selected one or more vehicles, wherein the selected one or more vehicles are rerouted to record data of the traffic incident; and verifying the detected traffic incident based on data of the traffic incident recorded by the rerouted one or more vehicles.

11. The method of claim 10, further comprising:

determining an initial confidence score associated with the detected traffic incident, by use of a machine learning model.

12. The method of claim 11, further comprising providing, as an input to the machine learning model, at least one of:

a functional class of the detected traffic incident, a level of congestion associated with the detected traffic incident, a type of incident of the detected traffic incident, a current time of a day, a road topology associated with the location of the detected traffic incident, and a current weather condition and an amount of visibility at the location of the detected traffic incident, to receive an output as the initial confidence score associated with the detected traffic incident.

13. The method of claim 10, further comprising determining a number of the one or more vehicles required for the verification of the traffic incident detected at the location, wherein the determination is based on a comparison of an initial confidence score associated with the detected traffic incident with a predefined threshold score.

14. The method of claim 10, further comprising selecting the one or more vehicles for the verification of the traffic incident based on at least one of:

proximity of the one or more vehicles with the location of the traffic incident, accessibility of the one or more vehicles to reach near the location of the traffic incident, received confirmation of a user of each vehicle of the one or more vehicles to verify the traffic incident, congestion at the location of the traffic incident, cost incurred for rerouting the one or more vehicles to the determined route of travel, sensors associated with the one or more vehicles, and impact on a distance of travel of the rerouted one or more vehicles, wherein the one or more vehicles are selected to maximize an initial confidence score associated with the detected traffic incident to reach a predefined threshold score with utilization of a minimum number of the selected one or more vehicles.

15. The method of claim 10, further comprising determining the route of travel for each vehicle of the selected one or more vehicles based on at least one of:

ease of reversal of the one or more vehicles on the determined route of travel;

an amount of diversion required by the one or more vehicles to travel on the determined route of travel as compared to an initial route of travel of the one or more vehicles; and a line of sight of the one or more vehicles to the location of the detected traffic incident on the determined route of travel, and wherein the route of travel is determined to maximize an initial confidence score associated with the detected traffic incident to reach a predefined threshold score with utilization of a minimum number of the selected one or more vehicles.

16. The method of claim 10, further comprising generating an updated confidence score based on an initial confidence score associated with the detected traffic incident and the data of the traffic incident recorded by each rerouted vehicle of the one or more vehicles.

17. The method of claim 16, further comprising:

comparing the updated confidence score associated with the detected traffic incident with a predefined threshold score;

preventing the rerouting of at least one of the selected one or more vehicles based on the comparison, when the updated confidence score is equal to or more than the predefined threshold score; and controlling a reversal of the one or more vehicles on the determined route of travel, when the compared updated confidence score is equal to or more than the predefined threshold score.

18. The method of claim 10, wherein the received traffic incident trigger is based on at least one of: traffic incident feed associated with the location of the traffic incident, sensor data of a vehicle associated with the traffic incident, and a time space diagram associated with the traffic incident.

19. A computer programmable product comprising a non-transitory computer readable medium having stored thereon computer executable instruction which when executed by one or more processors, cause the one or more processors to carry out operations for verification of a traffic incident, the operations comprising:

receiving a traffic incident trigger;

selecting one or more vehicles for verification of a traffic incident detected at a location, based on the received traffic incident trigger;

determining a route of travel for each vehicle of the selected one or more vehicles, wherein the determined route of travel for each vehicle is based on the location of the detected traffic incident;

rerouting the selected one or more vehicles on the respective route of travel determined for each vehicle of the selected one or more vehicles, wherein the selected one or more vehicles are rerouted to record data of the traffic incident; and verifying the detected traffic incident based on the data of the traffic incident recorded by the rerouted one or more vehicles.

20. The computer programmable product of claim 19, wherein the operations further comprise determining an initial confidence score associated with the detected traffic incident, by use of a machine learning model.

* * * * *